United States Patent
Kojima et al.

(10) Patent No.: US 9,211,613 B2
(45) Date of Patent: Dec. 15, 2015

(54) FLUX-CORED WIRE FOR GAS SHIELD ARC WELDING USE ENABLING ALL-POSITION WELDING

(75) Inventors: Kazuhiro Kojima, Tokyo (JP); Ryuichi Shimura, Tokyo (JP); Kiyohito Sasaki, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 13/513,904

(22) PCT Filed: Dec. 14, 2010

(86) PCT No.: PCT/JP2010/072834
§ 371 (c)(1),
(2), (4) Date: Jun. 5, 2012

(87) PCT Pub. No.: WO2011/074689
PCT Pub. Date: Jun. 23, 2011

(65) Prior Publication Data
US 2012/0241433 A1    Sep. 27, 2012

(30) Foreign Application Priority Data
Dec. 16, 2009 (JP) ................................. 2009-285230

(51) Int. Cl.
*B23K 35/368* (2006.01)
*B23K 35/02* (2006.01)
(Continued)

(52) U.S. Cl.
CPC ............. *B23K 35/0266* (2013.01); *B23K 35/02* (2013.01); *B23K 35/30* (2013.01);
(Continued)

(58) Field of Classification Search
CPC ........................... B23K 35/02; B23K 35/0266
USPC ............ 219/145.21–145.24, 137 WM, 137 R
See application file for complete search history.

(56) References Cited

U.S. PATENT DOCUMENTS 3,351,734 A * 11/1967 Arikawa et al. ........... 219/137 R
3,542,998 A * 11/1970 De Huff .................... 219/146.52
(Continued)

FOREIGN PATENT DOCUMENTS

CN       1117903          3/1993
CN       1117903  A *     3/1996
(Continued)

OTHER PUBLICATIONS

Wegrzyn; Toxicity, Porosity and impact strength; problems in welding with self-sheidling cored wires; 1993; vol. 7, Issue 9; 677-682.*
(Continued)

*Primary Examiner* — Dana Ross
*Assistant Examiner* — Renee L Miller
(74) *Attorney, Agent, or Firm* — Kenyon & Kenyon LLP

(57) ABSTRACT

A flux-cored wire for gas shielded welding use which can reduce the oxygen of weld metal to obtain a weld joint which is excellent in toughness and which enables all-position welding by direct current reverse polarity, wherein the wire contains, by mass % with respect to the wire total mass, CaO: 0.2 to 7.0%, one or more of $MgF_2$, $CaF_2$, $SrF_2$, and $BaF_2$ in a total of 1.0% or more (total of fluorides and CaO being 3.0 to 12.0%), one or more of Si, Al (less than 0.3%), Ti, Mg, Zr, Ca, Ce, and La in a total of 0.2 to 2.0%, and one or more oxides of Si, Mn, Al, Ti, B, and Zr in a total of 0.2 to 3.0%, $\alpha$=C+Si/30+Mn/20+Cu/20+Ni/60+Cr/20+Mo/15+V/10+Nb/10+5B is 0.15 to 0.40%, P and S in a total of 0.040% or less, a balance of Fe, an arc stabilizer, unavoidable impurities, and a content of iron powder in the flux of 5.0% or less.

5 Claims, 3 Drawing Sheets

(51) Int. Cl.
*B23K 35/30* (2006.01)
*B23K 35/36* (2006.01)
*B23K 35/362* (2006.01)

(52) U.S. Cl.
CPC ........... *B23K35/3602* (2013.01); *B23K 35/362* (2013.01); *B23K 35/3605* (2013.01); *B23K 35/368* (2013.01)

(56) References Cited

U.S. PATENT DOCUMENTS

| | | | | |
|---|---|---|---|---|
| 4,149,063 | A * | 4/1979 | Bishel | 219/146.23 |
| 4,363,951 | A * | 12/1982 | Shiga | 219/73 |
| 4,571,480 | A * | 2/1986 | Sakai et al. | 219/146.3 |
| 5,171,958 | A * | 12/1992 | Yamaguchi et al. | 219/73 |
| 5,300,754 | A * | 4/1994 | Gonzalez et al. | 219/146.3 |
| 5,580,475 | A * | 12/1996 | Sakai et al. | 219/145.22 |
| 6,188,037 | B1 * | 2/2001 | Hamada et al. | 219/61 |
| 6,441,334 | B1 * | 8/2002 | Aida et al. | 219/74 |
| 6,940,042 | B2 * | 9/2005 | Hara et al. | 219/145.22 |
| 7,091,448 | B2 * | 8/2006 | North et al. | 219/137 R |
| 7,812,284 | B2 * | 10/2010 | Narayanan et al. | 219/146.23 |
| 2004/0020912 | A1 * | 2/2004 | Hara et al. | 219/145.22 |
| 2004/0232131 | A1 * | 11/2004 | North et al. | 219/145.22 |
| 2005/0189337 | A1 * | 9/2005 | Baune | 219/145.23 |
| 2006/0255026 | A1 * | 11/2006 | North et al. | 219/137 WM |
| 2007/0012673 | A1 * | 1/2007 | Narayanan et al. | 219/137 R |
| 2007/0051702 | A1 * | 3/2007 | James et al. | 219/73 |
| 2008/0078809 | A1 * | 4/2008 | Kapoor et al. | 228/101 |

FOREIGN PATENT DOCUMENTS

| | | | |
|---|---|---|---|
| JP | 62-151293 | | 7/1987 |
| JP | 2-207996 | | 8/1990 |
| JP | 2-217195 | | 8/1990 |
| JP | 02207996 A | * | 8/1990 |
| JP | 02217195 A | * | 8/1990 |
| JP | 5-329684 | | 12/1993 |
| JP | 6-238483 | | 8/1994 |
| JP | 7-164184 | | 6/1995 |
| JP | 7-276088 | | 10/1995 |
| JP | 9-248694 | | 9/1997 |
| JP | H10296486 | | 11/1998 |
| JP | 2001-205482 | | 7/2001 |
| JP | 3586362 | | 8/2004 |
| JP | 2008-119748 | | 5/2008 |
| JP | 2011020154 | | 2/2011 |

OTHER PUBLICATIONS

International Search Report dated Mar. 15, 2011, issued in corresponding PCT Application No. PCT/JP2010/072834.
Office Action dated Jan. 20, 2014 issued in corresponding Chinese Application No. 201080056957.8.
Search Report dated Dec. 2, 2014 issued in corresponding European Application No. 10837713.6.

* cited by examiner

● : CENTER POSITION OF BEAM WIDTH

MEASURE DISTANCE (Y)

FLUX-CORED WIRE FOR GAS SHIELD ARC WELDING USE ENABLING ALL-POSITION WELDING

This application is a national stage application of International Application No. PCT/JP2010/072834, filed Dec. 14, 2010, which claims priority to Japanese Application No. 2009-285230, filed Dec. 16, 2009, the content of which is incorporated by reference in its entirety.

TECHNICAL FIELD

The present invention relates to a flux-cored wire for gas shielded arc welding use enabling all-position welding, more particularly relates to a flux-cored wire for gas shielded arc welding use which can reduce the oxygen of the weld metal to 300 mass ppm or less to obtain a weld metal which is excellent in toughness and which can be used by direct current reverse polarity (polarity making welding wire positive electrode).

BACKGROUND ART

Flux-cored wire for gas shielded welding use is spreading widely throughout the industrial world as a welding material which enables use of a high efficiency welding method, but the majority of this is flux-cored wire having Ti oxides such as rutile as the main slag-forming material (below, sometimes abbreviated as "rutile-type FCW").

A rutile-type FCW has excellent welding work efficiency and has the feature of enable easy welding at flat, vertical, overhead, horizontal, and other various welding positions. However, sometimes the high content of oxygen of the weld metal becomes a problem. That is, when using a rutile-type FCW, in weld metal of high strength steel or low temperature use steel, securing the necessary extent of toughness often becomes difficult. The facts that this is caused by the oxygen in the weld metal being present as non-metal inclusions and that these inclusions become the initiation points of cracks has been well known from previous research works. To solve this problem, a rutile-type FCW where reduction of the amount of oxygen of the weld metal is attempted has also been studied up to now. The specific results of the studies are disclosed in for example PLT's 1 to 3 etc.

That is, in PLT 1, the strongly deoxidizing elements Ca and Al are added to reduce the amount of oxygen in the weld metal, but even in the examples, the amount of oxygen is only reduced down to 334 mass ppm. The effect is not satisfactory.

In PLT 2, the deoxidizing elements Si, Mn, Mg, and Ti are added to restrict the total amount of oxides, including $TiO_2$, and study the reduction of oxygen in the weld metal, but in the examples, only an effect of reduction down to 350 mass ppm is confirmed. The improvement is insufficient.

In PLT 3, use of restriction of the total amount of oxides, including $TiO_2$, addition of $CaF_2$, and addition of the deoxidizing elements Si, Mn, and Mg to reduce oxygen in weld metal is studied, but the amount of oxygen of the weld metal is 300 mass ppm or more. In this invention as well, the amount of oxygen of the weld metal cannot be sufficiently reduced.

Flux-cored wire includes, in addition to the rutile-based wire, wire using fluorides as main slag-forming materials (below, sometimes indicated as "fluoride-based FCW"). A fluoride-based FCW differs from a rutile-type FCW in that it enables easy reduction of the amount of oxygen of the weld metal, but has the issues that it is limited in welding position to flat or horizontal fillet and that vertical, overhead, and horizontal welding are extremely difficult. Specific case studies are for example disclosed by PLT's 4 to 7 which are listed below.

In PLT 4, fluorides of Ca, Ba, Mg, and Sr and carbonates and composite oxides of Ca, Ba, Mg, and Sr are studied as the main slag systems, but welding in a vertical, overhead, and horizontal position was not evaluated. Furthermore, the amount of oxygen of the weld metal and the results of evaluation of toughness are also not disclosed. That is, from PLT 4, no technical suggestions can be obtained at all on flux-cored wire with which all-position welding is possible and with which high toughness weld metal can be obtained.

In PLT 5, the content of the amounts of $BaF_2$, Ni, Mn, C, Al, Si, and oxides is restricted to reduce the amount of oxygen of the weld metal down to 50 mass ppm, but this is predicated on welding by a direct current straight polarity using the welding wire as the negative electrode. With direct current straight polarity, lack of fusion easily occurs and the arc also becomes unstable, so the discovery which is disclosed here is also not sufficient.

In PLT 6, a flux which contains $CaF_2$ and which contains composite oxides of alkali metals or alkali earth metals and Ti and Si is used to reduce the amount of oxygen of the weld metal down to 251 mass ppm, but there is no description of vertical, overhead, and horizontal welding. From PLT 6, no technical suggestions at all are obtained on flux-cored wire which enables all-position welding.

In PLT 7, $BaF_2$ is added and the deoxidizing metal elements and other flux ingredients are adjusted to reduce the amount of oxygen of the weld metal, but only flat and vertical position welding are studied. Overhead welding and horizontal welding are not described at all. The content is insufficient for achieving all-position welding.

Further, in PLT 7, as an essential condition for enabling vertical welding, the content of Al is limited to 0.3% or more, so there is the issue that the weld metal deteriorates in toughness. In PLT 7, the deterioration in toughness cannot be completely avoided, so in a Charpy test, a 55 J or higher absorbed energy is deemed passing, but with a 55 J absorbed energy, there would be many structures which would not satisfy the design standard.

To obtain a high toughness weld metal, it is necessary to limit the Al content in the wire to less than 0.3%, but no technical suggestions at all can be obtained from PLT 7 on fluoride-based FCW which satisfies this requirement and enables welding in flat, vertical, overhead, and horizontal positions.

Summarizing the above, it is possible to conclude that there has not been flux-cored wire where a power source polarity using a direct current reverse polarity (polarity using welding wire as positive electrode) is possible, the content of Al can be restricted to a mass ratio with respect to the wire total mass of less than 0.3% to enable welding in the flat, vertical, overhead, and horizontal welding positions, oxygen of the weld metal can be stably suppressed to 300 mass ppm or less, and, as a result, the Charpy absorbed energy exceeds 200 J. In fact, no flux-cored wire which satisfies these characteristics has been commercialized up to the present.

CITATIONS LIST

Patent Literature

PLT 1: Japanese Patent Publication (A) No. 06-238483
PLT 2: Japanese Patent Publication (A) No. 07-164184
PLT 3: Japanese Patent Publication (A) No. 07-276088
PLT 4: Japanese Patent Publication (A) No. 05-329684

PLT 5: Japanese Patent No. 3586362
PLT 6: Japanese Patent Publication (A) No. 2001-205482
PLT 7: Japanese Patent Publication (A) No. 2008-119748

SUMMARY OF INVENTION

Technical Problem

The present invention was made in consideration of the above problems in the prior art and has as its object the provision of flux-cored wire for gas shielded welding use which has a totally new flux composition never before known in the past.

Solution to Problem

The gist of the present invention for solving the above problems is as follows:
(1) A flux-cored wire for gas shielded arc welding use comprised of a steel sheath which is filled with a flux, the flux-cored wire for gas shielded arc welding use characterized by simultaneously satisfying the conditions of the following (a) to (f):
  (a) CaO is contained in a mass % with respect to a wire total mass of 0.2% or more and 7.0% or less.
  (b) One or more of $MgF_2$, $CaF_2$, $SrF_2$, and $BaF_2$ is contained, a total of the content is a mass % with respect to the wire total mass of 1.0% or more, and a total of one or more of $MgF_2$, $CaF_2$, $SrF_2$, and $BaF_2$ and CaO is a mass % with respect to the wire total mass of 3.0% or more and 12.0% or less.
  (c) One or more of a metal state Si, Al, Ti, Mg, Zr, Ca, Ce, and La is contained, a total of the content is, with respect to the wire total mass, 0.2% or more and 2.0% or less, and a range of content of metal state Al is limited to a mass % with respect to the wire total mass of less than 0.3%.
  (d) A value of α which is defined by the following formula (1) is 0.15 or more and 0.40 or less in range and a total of the contents of P and S is limited to a mass % with respect to the wire total mass of 0.040% or less.

$$\alpha = N(C) + N(Si)/30 + N(Mn)/20 + N(Cu)/20 + N(Ni)/60 + N(Cr)/20 + N(Mo)/15 + N(V)/10 + N(Nb)/10 + 5N(B). \quad \text{formula (1)}$$

where N(X): mass % of the element X with respect to the wire total mass.
  (e) A total of contents of Si oxides, Mn oxides, Al oxides, Ti oxides, B oxides, and Zr oxides is a mass % with respect to the wire total mass of 0.2% or more and 3.0% or less.
  (f) A balance of Fe, an arc stabilizer, and unavoidable impurities, and a content of iron powder in the flux is a mass % with respect to the wire total mass of 5.0% or less.
(2) A flux-cored wire for gas shielded arc welding use as set forth in (1) characterized in that, further, one or more of $CaCO_3$, $MgCO_3$, $SrCO_3$, and $BaCO_3$ is contained and in that the total of the contents is a mass % with respect to the wire total mass of 0.1% or more and 4.0% or less.
(3) A flux-cored wire for gas shielded arc welding use as set forth in (1) or (2) characterized in that, further, one or more of MgO, SrO, and BaO is contained and in that the total of the contents is a mass % with respect to the wire total mass of 0.1% or more and 3.2% or less.
(4) A flux-cored wire for gas shielded arc welding use as set forth in any one of (1) to (3) characterized in that there is no slit-shaped opening in the steel sheath causing absorption of moisture.

Advantageous Effects of Invention

If using the wire of the present invention, it is possible to strikingly reduce the amount of oxygen of the weld metal. Further, it becomes possible to use as is the direct current reverse polarity which is widely spread through the industrial world to enable welding in the flat, vertical, overhead, and horizontal positions. This discovery enables simultaneous achievement of greater welding work efficiency and improved reliability of welded joints. The value of utilization in industry can be said to be extremely high.

DESCRIPTION OF EMBODIMENTS

Figure 1:
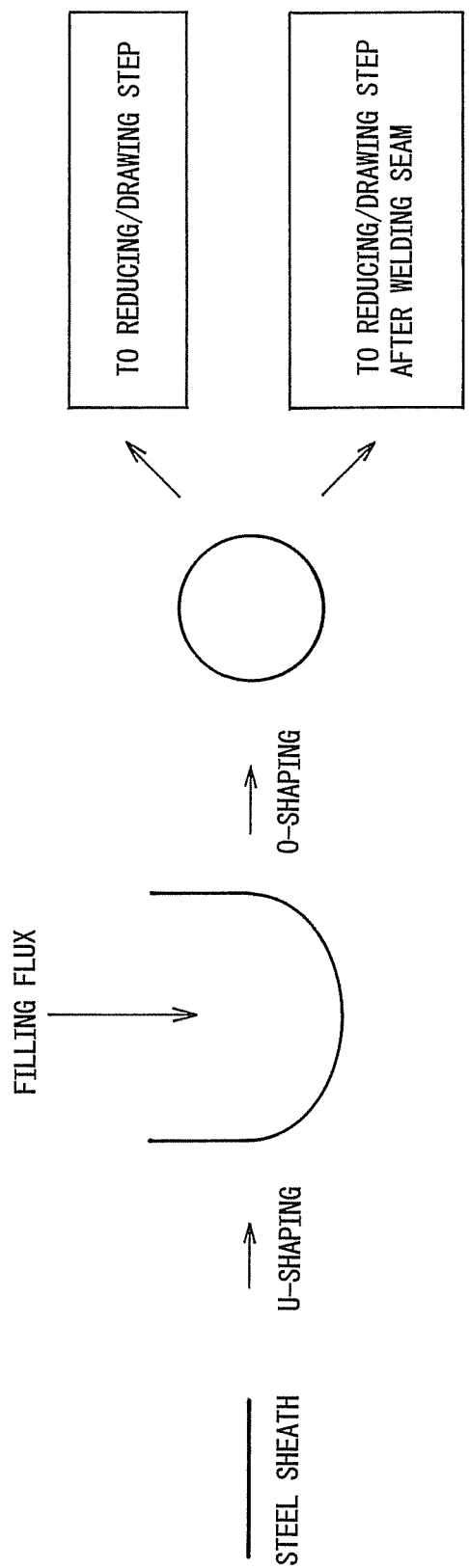
FIG. 1 is a view which explains the steps of production of a prototype wire.

Below, the content described in the claims will be explained more specifically to describe the advantageous effects of the present invention.

The present invention and prior findings clearly differ in the point of clearly defining the content of CaO as described in (a) of claim 1. When using a conventional fluoride-based FCW by a direct current reverse polarity, welding in the vertical, overhead, and horizontal positions is not possible because the melting point of the slag is low, so a molten pool cannot be maintained at these welding positions.

As a measure against this, in the wire of the present invention, the high melting point substance CaO is contained as an essential ingredient. CaO is an oxide, but is a strongly basic substance. Even if contained in wire, the amount of oxygen of the weld metal is never remarkably increased. Further, the melting point of CaO is an extremely high temperature of about 2570° C., it is also possible to raise the melting point of the slag.

The content of CaO is set as a mass % with respect to the wire total mass of 0.2% or more and 7.0% or less, but the reason is that if less than 0.2%, the content is too small and it is impossible to raise the melting point of the slag to an extent enabling welding in the vertical, overhead, and horizontal positions. Conversely, if more than 7.0% is contained, the slag melting point is too high, so solidification of the slag becomes faster and the fluidity of the slag cannot be secured, so slag inclusions easily occur. For this reason, the content of CaO with respect to the wire total mass is defined as 0.2% or more and 7.0% or less.

Further, if optimizing the timing of solidification of the slag, it is possible to suppress undercut. For this reason, the content of CaO is preferably made a mass % with respect to the wire total mass of 0.7% or more and 6.3% or less. Furthermore, to simultaneously obtain the spatter reducing effect and undercut inhibiting effect by arc stabilization, the content of CaO is more preferably made a mass % with respect to the wire total mass of 1.4% or more and 5.6% or less in range. Further, in accordance with need, the lower limit may be made 1.7% or more and the upper limit may be made 4.9% or less.

Note that, when including a composite oxide such as CaO. $SiO_2$ as the CaO, the content is calculated using the mass of only the CaO part.

Next, addition of $MgF_2$, $CaF_2$, $SrF_2$, and $BaF_2$ will be explained.

These fluorides are effective for raising the basicity of the slag and reducing the amount of oxygen of the weld metal. In addition, by these fluorides being contained along with CaO, the slag melting point can be adjusted to a suitable temperature. The melting point of CaO is an extremely high temperature of about 2570° C., but these four fluorides have melting points in the extremely close range of 1255° C. to 1400° C., so one or more of these four fluorides may be contained.

The total mass of the one or more of these four fluorides, to express this effect, has to be a mass % with respect to the wire total mass of 1.0% or more. Furthermore, the total mass of the one or more of $MgF_2$, $CaF_2$, $SrF_2$, and $BaF_2$ and the CaO has to be a mass % with respect to the wire total mass of 3.0% or more and 12.0% or less.

The reason is that if the total mass is less than 3.0%, the content is too small and an amount of slag which is sufficient for maintaining a molten pool in the vertical, overhead, and horizontal positions cannot be obtained. Conversely, if over 12.0% is included, the arc stability can no longer be maintained and the molten pool becomes unstable in all positions, so the amount of generation of fumes becomes greater and the welding work environment is easily detrimentally affected.

For this reason, the total mass of the one or more of $MgF_2$, $CaF_2$, $SrF_2$, and $BaF_2$ and the CaO is defined as 3.0% or more and 12.0% or less with respect to the wire total mass.

Note that, if optimizing the total content of the one or more of $MgF_2$, $CaF_2$, $SrF_2$, $BaF_2$ and CaO, the arc stability is further improved and as a result the effect of stabilizing the bead width is obtained. From this viewpoint, the total content of the one or more of $MgF_2$, $CaF_2$, $SrF_2$, and $BaF_2$ and the CaO is preferably 4.0% or more and 10.0% or less with respect to the wire total mass. Further, in accordance with need, the lower limit may be made 5.0% or more and the upper limit may be made 9.0% or less.

Next, the action of the metal elements having a deoxidizing action will be explained.

It is known that the metal state Si, Al, Ti, Mg, Zr, Ca, Ce, and La all are elements which have powerful deoxidizing actions and are effective for reducing the oxygen in the weld metal. One or more of these elements are added in a mass % with respect to the wire total mass of 0.2% or more and 2.0% or less.

However, regarding Al, if excessively contained in wire, formation of fine microstructures due to the intragranular transformation around Ti oxides is suppressed, so the toughness of the weld metal is degraded. For this reason, the content of Al is set to a mass % with respect to the wire total mass of less than 0.3%. In accordance with need, the content may be restricted to 0.2% or less or 0.1% or less.

If the total mass of the one or more of Si, Al, Ti, Mg, Zr, Ca, Ce, and La is less than 0.2%, the content is too small and there is no effect on the reduction of the amount of oxygen of the weld metal. Further, if more than 2.0% is included, hard microstructures such as martensite-austenite constituents (hereinafter abbreviated as "MAC") easily form in the weld metal and the toughness of the weld metal is degraded.

Therefore, the total mass of one or more of the metal states Si, Al, Ti, Mg, Zr, Ca, Ce, and La was made a mass % with respect to the wire total mass of 0.2% or more and 2.0% or less. The total mass may also be made, in accordance with need, a lower limit of 0.6% or more or 0.8% or more and an upper limit of 1.8% or less or 1.5% or less.

Note that, these metal elements do not necessarily have to be pure metals (inclusion of unavoidable impurities is possible). There is no problem at all even if included in the form of an alloy such as Al—Mg. Note that, here, a deoxidation reaction during the welding is assumed, so Si, Al, Ti, Mg, Zr, Ca, Ce, and La are which are contained as oxides, fluorides, and carbonates are excluded. Further, whether these metal elements are contained in the steel sheath or contained in flux, the effect is the same, so inclusion in either the steel sheath or flux is possible.

Next, the value of a defined by the following formula (1) will be explained.

The present invention focuses on obtaining a weld metal with a high toughness, but an increase in toughness of the weld metal is not achieved by just the reduction of the oxygen. If the hardenability of the weld metal is not controlled to a suitable range, the weld metal comes to have coarse microstructures and hard microstructures. In this state, no matter how low the oxygen is reduced to, a high toughness weld metal cannot be obtained.

From this viewpoint, the inventors proceeded to study typical elements having an effect on the hardenability of weld metal such as C, Si, Mn, Cu, Ni, Cr, Mo, V, Nb, and B by using the value of a which is shown by the following formula (1).

As a result, it was learned that if the value of a is less than 0.15, the hardenability becomes insufficient, coarse grain boundary ferrite is formed, and the toughness of the weld metal is lowered. Conversely, if the value of a exceeds 0.40, the hardenability becomes excessive, the percentage of hard structures such as martensite increases, and the toughness of the weld metal deteriorates.

Due to this reason, the conclusion was reached that the value of α which is defined in the following formula (1) has to be restricted to 0.15 or more and 0.40 or less in range. This range may, in accordance with need, be restricted to a lower limit of 0.18 or more or 0.20 or more and to an upper limit of 0.36 or less or 0.34 or less.

$$\alpha=N(C)+N(Si)/30+N(Mn)/20+N(Cu)/20+N(Ni)/60+N(Cr)/20+N(Mo)/15+N(V)/10+N(Nb)/10+5N(B). \quad \text{formula (1)}$$

where N(X): mass % of element X with respect to wire total mass.

Note that, in formula (1), since the hardenability of the weld metal is being discussed, elements which are included as oxides, fluorides, and carbonates are excluded. These elements may be included in similar forms as the above Si etc.

Further, regarding P and S, these are widely known as harmful elements causing solidification cracks, a reduction in toughness, etc., so P and S are restricted to a total mass of a mass % with respect to the wire total mass of 0.040% or less. Note that, the total mass of P and S is preferably made as low as possible, but making the mass ratio with respect to the wire total mass 0.001% or less forces an excessive load on the refining step and remarkably impairs productivity, so this is not realistic. Therefore, the total mass of P and S does not have to be reduced to less than 0.001% with respect to the wire total mass.

Next, the Si oxides, Mn oxides, Al oxides, Ti oxides, B oxides, and Zr oxides will be explained.

It is known from research up to now that if these oxides are contained in the slag, the amount of oxygen of the weld metal increases. Therefore, to reduce the amount of oxygen of the weld metal, the content of these oxides is preferably kept as low as possible. However, these oxides have the effect of suppressing bead offset since when the weld bead is covered by slag, the uniformity of the covering is enhanced and the behavior of the molten pool is stabilized.

Here, the inventors experimentally searched for the ranges of contents of these oxides by which the amount of oxygen of the weld metal can be stably reduced to 300 mass ppm or less.

As a result, they discovered that if the total mass of the Si oxides, Mn oxides, Al oxides, Ti oxides, B oxides, and Zr oxides is a mass % with respect to the wire total mass of 0.2% or more and 3.0% or less, it is possible to suppress the amount of oxygen of the weld metal to 300 mass ppm or less and simultaneously realize the effect of suppression of bead offset.

For the above reason, the total mass of Si oxides, Mn oxides, Al oxides, Ti oxides, B oxides, and Zr oxides has to be restricted to a mass % with respect to the wire total mass of 0.2% or more and 3.0% or less. Further, the total mass may, in accordance with need, be restricted to a lower limit of 0.5% or more or 0.7% or more and to an upper limit of 2.8% or less or 2.2% or less.

Note that, when the oxides are composite oxides, for example, with $Al_2O_3 \cdot SiO_2$, the masses of the corresponding parts are calculated by deeming the part of $Al_2O_3$ the Al oxides and deeming the part of $SiO_2$ the Si oxides so as to find the total mass. The content of the Si oxides is defined as the $SiO_2$ converted value, the content of the Mn oxides as the $MnO_2$ converted value, the content of the Al oxides as the $Al_2O_3$ converted value, the content of the Ti oxides as the $TiO_2$ converted value, the content of the B oxides as the $B_2O_3$ converted value, and the content of the Zr oxides as the $ZrO_2$ converted value.

Among the ingredients which are contained in the wire of the present invention, the balance other than the above ingredients consists of Fe, an arc stabilizer, and unavoidable impurities.

Note that, the content of the iron powder in the flux which is filled in the steel sheath has to be a mass % with respect to the wire total mass of 5.0% or less. Improvement of the welding efficiency and improvement of the arc stability due to the inclusion of iron powder in the flux are known, but iron powder is a powder, so has a large surface area so sometimes the oxygen of the weld metal is increased by the extremely thin iron oxide which is inevitably formed on the iron powder surface.

The inventors studied the content of the iron powder in the flux which can stably suppress the amount of oxygen of the weld metal to 300 ppm or less and as a result discovered that the content of the iron powder which is contained in the flux has to be a mass % with respect to the wire total mass of 5.0% or less. Further, they newly discovered that when making the content less than 3%, it is possible and more preferable to reduce the amount of oxygen of the weld metal down to 270 ppm or less.

Further, the content of iron powder which is contained in the flux may be restricted to 4.0% or less or 2.4% or less in accordance with need.

Further, when powder including Fe in the form of an alloy such as Fe—Si or Fe—Cr is included in the flux, the mass corresponding to the Fe in the alloy is added to the iron powder defined here.

As the arc stabilizer, oxides, fluorides, carbonates, etc. including Li, Na, K, and Rb which are known in the prior art may be suitably selected for use. Further, the mass of the arc stabilizer is suitably made a mass ratio with respect to the wire total mass of 0.01% or more and 1.0% or less. A content in this range is preferable.

The above was the basic constitution of the present invention. Due to this, reduction of the oxygen in the weld metal and flat, vertical, overhead, and horizontal welding can both be realized.

Next, the means for further improving the characteristics of the welding wire of the present invention will be explained.

First, $CaCO_3$, $MgCO_3$, $SrCO_3$, and $BaCO_3$ will be explained.

These carbonates break down by the arc heat and generate carbon dioxide gas from the inside of the wire so have the effect of facilitate detachment of the molten droplets which are formed at the tip of the wire at the time of welding and make the molten droplets finer. For this reason, large grain molten droplets do not move to the molten pool, so in the spatter, it becomes possible in particular to reduce the large grain spatter. If large grain spatter deposits on the welded object, not only is the bead appearance degraded, but also the large grain spatter often is troublesome to remove. For this reason, the value of the effect of reduction of the large-grain spatter rate is great.

To obtain this effect, the total content of one or more of $CaCO_3$, $MgCO_3$, $SrCO_3$, and $BaCO_3$ is preferably a mass % with respect to the wire total mass of 0.1% or more. Conversely, if the total content of one or more of $CaCO_3$, $MgCO_3$, $SrCO_3$, and $BaCO_3$ exceeds a mass % with respect to the wire total mass of 4.0%, the gas which is produced from inside the wire results in droplets of liquid being splattered from the tip of the wire resulting in a remarkable increase in the large size spatter.

Due to the above reason, the total content of one or more of $CaCO_3$, $MgCO_3$, $SrCO_3$, and $BaCO_3$ is preferably a mass % with respect to the wire total mass of 0.1% or more and 4.0% or less. To greatly reduce the large-grain spatter rate, the lower limit is more preferably made 0.7% or more or 1.4% or more and the upper limit is more preferably made 3.6% or less or 2.3% or less.

Note that, $CaCO_3$, $MgCO_3$, $SrCO_3$, and $BaCO_3$ are respectively, as shown in the following formula (2) to formula (5), substances which contain CaO, MgO, BaO, and SrO. When $CaCO_3$, $MgCO_3$, $SrCO_3$, and $BaCO_3$ are contained, the CaO, MgO, SrO, and BaO which are formed by heat decomposition are added to the contents of the above-mentioned CaO and later explained MgO, BaO, and SrO.

$$CaCO_3 \rightarrow CaO + CO_2 \quad \text{formula (2)}$$

$$MgCO_3 \rightarrow MgO + CO_2 \quad \text{formula (3)}$$

$$BaCO_3 \rightarrow BaO + CO_2 \quad \text{formula (4)}$$

$$SrCO_3 \rightarrow SrO + CO_2 \quad \text{formula (5)}$$

Next, the advantageous effects of MgO, SrO, and BaO will be explained.

MgO, SrO, and BaO act to reduce the viscosity of the slag, so have the effect of smoothening the toe of the weld bead and suppressing concentration of stress at a weld joint. To obtain this effect, inclusion by a mass % with respect to the wire total mass of 0.1% or more is necessary, but if the content is too great, the slag remarkably falls in viscosity, so the molten pool cannot be maintained in vertical, overhead, and horizontal welding and welding easily becomes impossible. For this reason, when including MgO, SrO, and BaO, the total content is preferably restricted to 0.1% or more and 3.2% or less with respect to the wire total mass. Further, the total content is, in accordance with need, restricted to a lower limit of 0.3% or more or 0.5% or more and to an upper limit of 2.7% or less or 2.0% or less.

Next, an explanation of the steel sheath of the welding wire will be given.

The wire of the present invention particularly preferably has no slit-shaped opening in the steel sheath causing moisture absorption. The flux which is used in the wire of the present invention contains a substance such as CaO, MgO, BaO, SrO, and fluorides which basically easily absorb moisture. For this reason, eliminating the slit-shaped opening causing moisture absorption is extremely useful from the viewpoint of preventing moisture absorption of the wire and stabilizing the quality of the welding wire. When there is a slit-shaped opening in the steel sheath, it is preferable to package the flux-cored wire in a container until right before use so as to suppress moisture absorption.

Furthermore, from the viewpoint of reducing the diffusive hydrogen, the lubrication oil which is coated on the wire surface is preferably an oil not containing H such as perfluoro polyether.

Note that, the diameter of the wire of the present invention is not particularly limited, but considering the welding efficiency and the wire productivity, 1.2 mm to 1.6 mm in range is preferable.

Further, the total mass of the flux which is filled in the steel sheath is preferably a mass % with respect to the wire total mass (below, this value being referred to as the "flux filling rate") of 6.0% or more and 18.0% or less. The flux which is contained in the steel sheath is in a powder state. The flux is stabilized in position inside the wire by being held from the steel sheath. If the flux filling rate is less than 6.0%, the amount of flux which is present becomes too small for the space formed inside of the steel sheath and the strength of inclusion of the flux becomes weak. For this reason, there is a high possibility of the flux ending up moving inside the wire and the ingredients in the wire becoming unstable. Conversely, if the flux filling rate exceeds 18.0%, breakage frequently occurs in the drawing step at the time of wire production and the productivity is impaired, so this is not realistic. Due to the above reason, the flux filling rate is preferably 6.0% or more and 18.0% or less.

Further, in the wire of the present invention, CaO, MgO, Si oxides, and Ti oxides are observed to tend to affect the slag peeling. From the viewpoint of expression of better slag peeling, in the mass ratio with respect to the wire total mass, the ratio of (CaO+MgO)/(Ti oxides+Si oxides) preferably exceeds 1.50.

EXAMPLES

Below, examples will be used to explain the present invention and comparative examples.

First, the steps of production of prototype wire will be explained. The steel sheath of the chemical composition which is shown in Table 1 is formed into a U-shape as shown in FIG. 1. At that stage, flux is filled inside the steel sheath from the top. After this, the sheath is formed into an O-shape. The resultant slitted wire is drawn to a prototype wire of a diameter of ϕ1.2 mm by a drawing step. Further, a wire with no slit is formed by filling the steel sheath with flux, then welding together its seam so as to eliminate the slit-shaped opening in the steel sheet which causes absorption of moisture to the flux, then drawing the wire after this step to finish it to prototype wire of a diameter of ϕ1.2 mm. In the examples of the present invention, the ingredients of the wire were adjusted by the flux which is filled inside the steel sheath in all cases.

TABLE 1

| C | Si | Mn | P | S | Balance | (mass %) |
|---|----|----|---|---|---------|----------|
| 0.03 | 0.10 | 0.50 | 0.007 | 0.005 | Fe and unavoidable impurities | |

Figure 2:
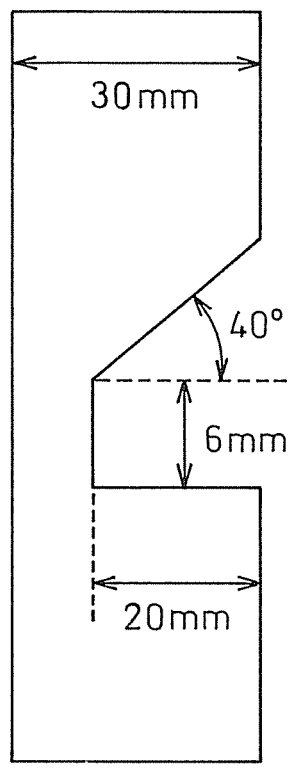
FIG. 2 is a view which shows the groove shape for horizontal welding used for evaluation of the present invention.
Figure 3:
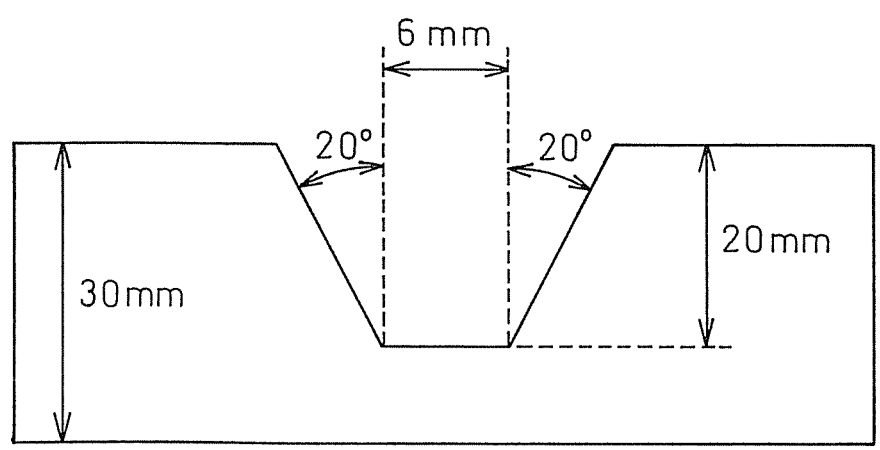
FIG. 3 is a view which shows the groove shapes for flat welding, vertical welding, and overhead welding used for evaluation of the present invention.

Using SM490B steel plate defined in JIS G 3106, grooves shown FIG. 2 and FIG. 3 were formed and the above-mentioned prototype wires were welded at the flat, vertical, overhead, and horizontal welding positions and evaluated. The chemical composition of the SM490B steel material which is used for the tests are shown in Table 2. Further, the welding conditions at the welding positions are shown in Table 3, while the evaluated items of the prototype wires and passing standards are described in Table 4. Note that, in the examples, a gas of Ar+20% $CO_2$ was used, but the wire of the present invention can be sufficiently used even if using a shield gas other than Ar+20% $CO_2$ (for example, $CO_2$ gas, He gas, or other generally used shield gas).

TABLE 2

| C | Si | Mn | P | S | Balance | (mass %) |
|---|----|----|---|---|---------|----------|
| 0.15 | 0.20 | 1.10 | 0.007 | 0.007 | Fe and unavoidable impurities | |

TABLE 3

| Welding positions | Current (A) | Voltage (V) | Welding rate (cm/min) | Shield gas | Power supply polarity |
|---|---|---|---|---|---|
| Flat | 270 | 25 | 24 | Ar + 20% $CO_2$ | Direct current reverse polarity wire (+) |
| Vertical | 200 | 21 | 9 | Ar + 20% $CO_2$ | Direct current reverse polarity wire (+) |
| Overhead | 200 | 21 | 9 | Ar + 20% $CO_2$ | Direct current reverse polarity wire (+) |
| Horizontal | 250 | 24 | 28 | Ar + 20% $CO_2$ | Direct current reverse polarity wire (+) |

TABLE 4

| Evaluated items and evaluation method | Passing standard | Test coverage |
|---|---|---|
| Bead formation<br>Evaluation method: Whether welds of 500 mm weld lengths are possible by grooves of different positions and whether test pieces for oxygen analysis tests and Charpy tests can be obtained from the weld metal. | Visual judgment | Wire nos.<br>1 to 124<br>149 to 155 |
| Presence of weld defects<br>Evaluation method: X-ray transmission and ultrasonic defect detection were used to confirm if there were cracks or slag inclusions in the weld metal. | Cases where no cracks or slag inclusions can be observed are judged as passing.<br>In the table of test results, slag inclusions are abbreviated as "SI", cracks as "C", and blowholes as "BH". | Wire nos.<br>1 to 124<br>149 to 155 |

TABLE 4-continued

Figure 4:
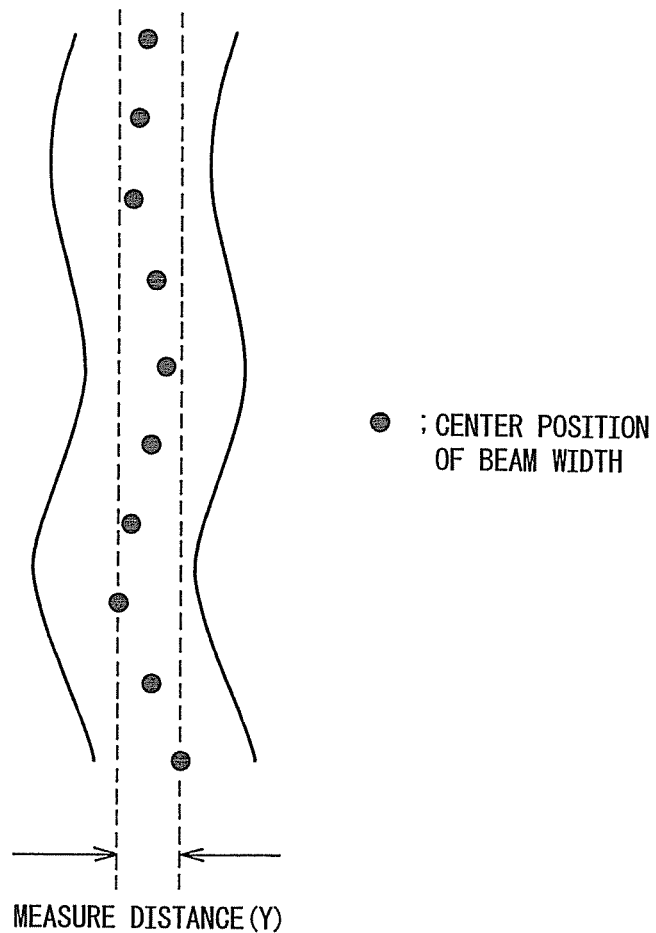
FIG. 4 is a view which shows a method of evaluation of offset of a bead.
Figure 5:
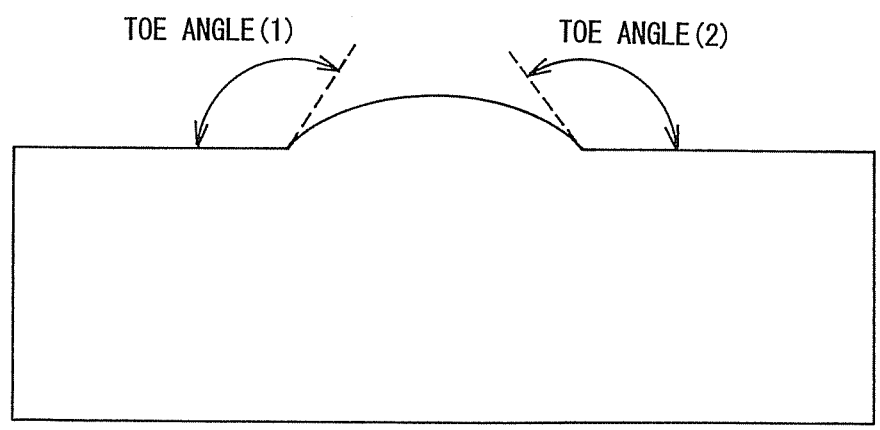
FIG. 5 is a view which shows a method of measurement of a toe angle of a bead.

| Evaluated items and evaluation method | Passing standard | Test coverage |
|---|---|---|
| Amount of oxygen of weld metal<br>Evaluation method: A pin sample for analysis is taken from the weld metal, and the infrared absorption method is used for analysis of the amount of oxygen of the weld metal. | Cases where the amount of oxygen of the weld metal is 300 ppm or less are judged as passing. | Wire nos.<br>1 to 124<br>149 to 155 |
| Toughness of weld metal<br>Evaluation method: A 10 mm full size test piece was taken from the weld metal and measured by a Charpy impact test. | Cases where three test pieces were tested at 0° C. and the average value of the absorbed energy was 200 J or more were judged as passing.<br>The table of test results describes the average values of three test pieces. | Wire nos.<br>1 to 124<br>149 to 155 |
| Depth of undercut<br>Evaluation method: Over the entire weld length of the surfacemost layer, the bead shape was measured three-dimensionally by a laser beam and the undercut depth measured. | Cases of a maximum depth of 0.5 mm or less were judged as passing. Further, cases of a maximum depth of 0.2 mm or less are judged as having an effect of improvement. | Wire nos.<br>1 to 13 |
| Occurrence of spatter<br>Evaluation method: Spatter produced per one minute arc time was trapped and the mass of the spatter was measured. | Cases of 1.5 g/min or less were judged as passing. Further, within 0.8 g/min, it is judged that an effect of improvement of inhibition of spatter is observed. | Wire nos.<br>1 to 13 |
| Generation of fumes<br>Evaluation method: Fumes produced per one minute arc time were trapped by filter paper and the change in mass of the filter paper was measured. | 1.0 g/min or less is deemed passing. | Wire nos.<br>14 to 32 |
| Stability of bead width<br>Evaluation method: Any bead at the surfacemost layer was selected and the bead width was measured. | Cases where the ratio of (minimum width of bead)/(maximum width of bead) was calculated and the value was 90% or more were judged as passing. Further, in case of 95% or more, it is judged that there is an effect of improvement of the bead width stability. | Wire nos.<br>14 to 32 |
| Presence of bead offset<br>Evaluation method: In the manner shown in FIG. 4, the center of the bead width was measured at 10 points at equal intervals. The distance (Y) between the right-most point and the left-most point was measured. | Cases where the value of Y defined by the left was 1 mm or less were judged as passing. | Wire nos.<br>69 to 86<br>149 to 152 |
| Rate of occurrence of large grain spatter<br>Evaluation method: The total amount of spatter trapped per one minute arc time was sieved by a screen of 1 mm mesh. The mass of the spatter not passing through the screen was measured. | Cases where the mass % with respect to the total spatter mass of the trapped mass of spatter which did not pass through a screen of 1 mm mesh was 20% or less were judged as passing. Further, in cases where this mass % was 10% or less, it was judged that there was an effect of reduction of large-grain spatter observed. | Wire nos.<br>97 to 112 |
| Bead toe angle<br>Evaluation method: As shown in FIG. 5, the weld zone was cut and 10 cross-sectional test pieces were cut out. The toe angles at two locations of the two sides of the test pieces, for a total of 20 locations, were measured and the average value was used for evaluation. | Cases where the average value of the toe angles were 120° or more were judged as passing. Further, in cases where the average value of the toe angles was 150° or more, it was judged that an effect of smoothening the toe angle was observed. | Wire nos.<br>113 to 124<br>153 to 155 |
| Diffusive hydrogen<br>Evaluation method: Diffusive hydrogen of the weld joint was measured based on the test method prescribed in JIS Z 3118. | Cases of 5 ppm or less were judged as passing, while cases of 2 ppm or less were judged as having an effect of suppressing moisture absorption by the wire. | Wire nos.<br>1, 7, 11, 14, 20, 29, 33, 43, 53, 57, 61, 65, 69, 76, 79, 87, 91, 95, 97, 104, 111, 113, 118, 123, and 125 to 148 |
| Slag peeling | Cases where slag naturally peeled off from the bead surface were evaluated as A and judged as passing.<br>Cases where slag peeled off from the bead surface by being struck several times and slag removal work was completed in within 30 seconds were evaluated as B and judged as passing.<br>Cases where peeling of slag was difficult and slag removal work required more than 30 seconds were evaluated as C and judged as not passing. | Wire nos.<br>113 to 124<br>153 to 155 |

Note
(1) Regarding all of the above evaluation tests, the bead part and the crater part within 50 mm from the welding start position are both excluded from evaluation as unstable regions.
(2) In the table of the test results, passing was indicated as "Good" and not passing as "Poor".

First, the content of CaO was examined using the wires of Wire Nos. 1 to 13 which are shown in Table 5. The test results are shown in Table 6 and Table 7.

In Wire Nos. 1 to 11 where the content of CaO was a mass % with respect to the wire total mass of 0.2% or more and 7.0% or less, all wires were judged passing, that is, good results were obtained. Further, in Wire Nos. 2 to 10 where the content of CaO was a mass % with respect to the wire total mass of 0.7% or more and 6.3% or less, an undercut inhibiting effect was observed. Further, in Wire Nos. 3 to 9 where the content of CaO was a mass % with respect to the wire total mass of 1.4% or more and 5.6% or less, it was confirmed that effects of suppressing undercut and reducing spatter were simultaneously obtained.

TABLE 5

| | | Mass % with respect to wire total mass | | | | | | |
|---|---|---|---|---|---|---|---|---|
| Class | Wire no. | CaO | MgF$_2$ | CaF$_2$ | SrF$_2$ | BaF$_2$ | Total content of MgF$_2$, CaF$_2$, SrF$_2$, and BaF$_2$ | Total content of CaO, MgF$_2$, CaF$_2$, SrF$_2$, and BaF$_2$ |
| Inv. ex. | 1 | 0.2 | 1.0 | 1.0 | 1.0 | 1.5 | 4.5 | 4.7 |
| Inv. ex. | 2 | 0.7 | 4.5 | 0.0 | 0.0 | 0.0 | 4.5 | 5.2 |
| Inv. ex. | 3 | 1.4 | 0.0 | 4.5 | 0.0 | 0.0 | 4.5 | 5.9 |
| Inv. ex. | 4 | 2.1 | 0.0 | 0.0 | 4.5 | 0.0 | 4.5 | 6.6 |
| Inv. ex. | 5 | 2.8 | 0.0 | 0.0 | 0.0 | 4.5 | 4.5 | 7.3 |
| Inv. ex. | 6 | 3.5 | 0.0 | 3.0 | 0.0 | 1.5 | 4.5 | 8.0 |
| Inv. ex. | 7 | 4.2 | 1.5 | 0.0 | 3.0 | 0.0 | 4.5 | 8.7 |
| Inv. ex. | 8 | 4.9 | 2.0 | 1.0 | 1.0 | 0.5 | 4.5 | 9.4 |
| Inv. ex. | 9 | 5.6 | 1.0 | 2.0 | 0.5 | 1.0 | 4.5 | 10.1 |
| Inv. ex. | 10 | 6.3 | 0.5 | 1.0 | 1.0 | 2.0 | 4.5 | 10.8 |
| Inv. ex. | 11 | 7.0 | 1.0 | 0.5 | 2.0 | 1.0 | 4.5 | 11.5 |
| Comp. ex. | 12 | 0.1 | 1.0 | 1.0 | 1.0 | 1.5 | 4.5 | 4.6 |
| Comp. ex. | 13 | 7.1 | 1.0 | 1.0 | 1.0 | 1.5 | 4.5 | 11.6 |

The ingredients other than the above were as follows. The units are mass % with respect to the wire total mass.

Contents of deoxidizing metal elements

| Si | Al | Ti | Mg | Zr | Ca | Ce | La | Total |
|---|---|---|---|---|---|---|---|---|
| 0.4 | 0.0 | 0.1 | 0.2 | 0.0 | 0.0 | 0.0 | 0.0 | 0.7 |

Alloy ingredients of wire

| C | Si | Mn | P | S | Cu | Ni | Cr | Mo | V | Nb | B | α | Total of P and S |
|---|---|---|---|---|---|---|---|---|---|---|---|---|---|
| 0.06 | 0.40 | 1.65 | 0.006 | 0.006 | 0.00 | 1.60 | 0.00 | 0.20 | 0.00 | 0.00 | 0.00 | 0.20 | 0.012 |

Contents of oxides

| Si oxides | Mn oxides | Al oxides | Ti oxides | B oxides | Zr oxides | Total |
|---|---|---|---|---|---|---|
| 1.0 | 0.0 | 0.0 | 0.1 | 0.0 | 0.0 | 1.1 |

Contents of carbonates

| MgCO$_3$ | CaCO$_3$ | SrCO$_3$ | BaCO$_3$ | Total |
|---|---|---|---|---|
| 0.0 | 0.0 | 0.0 | 0.0 | 0.0 |

Contents of MgO, BaO, and SrO | Contents of iron powder in flux

| MgO | BaO | SrO | Total | Iron powder |
|---|---|---|---|---|
| 0.0 | 0.0 | 0.0 | 0.0 | 0.6 |

| Class | | | | Inv. ex. | | | | | | | Comp. ex. | Class |
|---|---|---|---|---|---|---|---|---|---|---|---|---|
| Wire Nos. | 1 | 2 | 3 | 4 | 5 | 6 | 7 | 8 | 9 | 10 | 11 | 12 | 13 |
| Flux filling rate | 10 | 11 | 11 | 12 | 13 | 13 | 14 | 15 | 16 | 16 | 17 | 10 | 17 |

Others

| Arc stabilizer | Slit-shaped opening in steel sheath |
|---|---|
| K$_2$O contained to 0.03% | Yes |

TABLE 6

| Class | Wire no. | Bead formation | Weld defect | Weld metal oxygen amount (ppm) | Charpy test results (J) | Undercut max. depth (mm) | Spatter (g/min) | Results of evaluation |
|---|---|---|---|---|---|---|---|---|
| Flat |||||||||
| Inv. ex. | 1 | Good | None | 260 | 214 | 0.4 | 1.2 | Good |
| Inv. ex. | 2 | Good | None | 258 | 241 | 0.2 | 1.1 | Good |
| Inv. ex. | 3 | Good | None | 263 | 235 | 0.1 | 0.7 | Good |
| Inv. ex. | 4 | Good | None | 245 | 239 | 0.0 | 0.7 | Good |
| Inv. ex. | 5 | Good | None | 240 | 235 | 0.0 | 0.5 | Good |
| Inv. ex. | 6 | Good | None | 260 | 244 | 0.0 | 0.6 | Good |
| Inv. ex. | 7 | Good | None | 244 | 245 | 0.1 | 0.6 | Good |
| Inv. ex. | 8 | Good | None | 252 | 226 | 0.1 | 0.7 | Good |
| Inv. ex. | 9 | Good | None | 235 | 248 | 0.1 | 0.7 | Good |
| Inv. ex. | 10 | Good | None | 225 | 218 | 0.2 | 0.9 | Good |
| Inv. ex. | 11 | Good | None | 241 | 223 | 0.4 | 1.0 | Good |
| Comp. ex. | 12 | Good | None | 248 | 208 | 0.5 | 1.2 | Good |
| Comp. ex. | 13 | Good | SI | 366 | 123 | 0.5 | 1.2 | Poor |
| Vertical |||||||||
| Inv. ex. | 1 | Good | None | 245 | 236 | 0.3 | 1.4 | Good |
| Inv. ex. | 2 | Good | None | 231 | 225 | 0.1 | 1.3 | Good |
| Inv. ex. | 3 | Good | None | 263 | 247 | 0.1 | 0.7 | Good |
| Inv. ex. | 4 | Good | None | 248 | 230 | 0.0 | 0.7 | Good |
| Inv. ex. | 5 | Good | None | 257 | 215 | 0.0 | 0.6 | Good |
| Inv. ex. | 6 | Good | None | 265 | 238 | 0.0 | 0.6 | Good |
| Inv. ex. | 7 | Good | None | 240 | 240 | 0.1 | 0.7 | Good |
| Inv. ex. | 8 | Good | None | 266 | 247 | 0.1 | 0.6 | Good |
| Inv. ex. | 9 | Good | None | 240 | 228 | 0.2 | 0.7 | Good |
| Inv. ex. | 10 | Good | None | 239 | 238 | 0.1 | 1.1 | Good |
| Inv. ex. | 11 | Good | None | 244 | 236 | 0.4 | 1.3 | Good |
| Comp. ex. | 12 | Poor | Welding not possible | Poor | | | | |
| Comp. ex. | 13 | Good | SI | 359 | 149 | 0.5 | 1.3 | Poor |

TABLE 7

| Class | Wire no. | Bead formation | Weld defect | Weld metal oxygen amount (ppm) | Charpy test results (J) | Undercut max. depth (mm) | Spatter (g/min) | Results of evaluation |
|---|---|---|---|---|---|---|---|---|
| Overhead |||||||||
| Inv. ex. | 1 | Good | None | 264 | 241 | 0.4 | 1.4 | Good |
| Inv. ex. | 2 | Good | None | 249 | 232 | 0.2 | 1.3 | Good |
| Inv. ex. | 3 | Good | None | 263 | 236 | 0.1 | 0.8 | Good |
| Inv. ex. | 4 | Good | None | 258 | 238 | 0.0 | 0.8 | Good |
| Inv. ex. | 5 | Good | None | 241 | 219 | 0.0 | 0.7 | Good |
| Inv. ex. | 6 | Good | None | 262 | 245 | 0.0 | 0.6 | Good |
| Inv. ex. | 7 | Good | None | 257 | 250 | 0.1 | 0.6 | Good |
| Inv. ex. | 8 | Good | None | 246 | 218 | 0.1 | 0.7 | Good |
| Inv. ex. | 9 | Good | None | 242 | 233 | 0.2 | 0.7 | Good |
| Inv. ex. | 10 | Good | None | 240 | 249 | 0.2 | 1.2 | Good |
| Inv. ex. | 11 | Good | None | 248 | 225 | 0.4 | 1.1 | Good |
| Comp. ex. | 12 | Poor | Welding impossible | | | | | Poor |
| Comp. ex. | 13 | Good | SI | 377 | 177 | 0.5 | 1.3 | Poor |
| Horizontal |||||||||
| Inv. ex. | 1 | Good | None | 249 | 223 | 0.4 | 1.2 | Good |
| Inv. ex. | 2 | Good | None | 251 | 231 | 0.2 | 1.3 | Good |
| Inv. ex. | 3 | Good | None | 255 | 236 | 0.1 | 0.7 | Good |
| Inv. ex. | 4 | Good | None | 248 | 222 | 0.0 | 0.7 | Good |
| Inv. ex. | 5 | Good | None | 265 | 235 | 0.0 | 0.7 | Good |
| Inv. ex. | 6 | Good | None | 246 | 218 | 0.0 | 0.6 | Good |
| Inv. ex. | 7 | Good | None | 239 | 221 | 0.1 | 0.6 | Good |
| Inv. ex. | 8 | Good | None | 254 | 213 | 0.1 | 0.6 | Good |

TABLE 7-continued

| Class | Wire no. | Bead formation | Weld defect | Weld metal oxygen amount (ppm) | Charpy test results (J) | Undercut max. depth (mm) | Spatter (g/min) | Results of evaluation |
|---|---|---|---|---|---|---|---|---|
| Inv. ex. | 9 | Good | None | 249 | 229 | 0.2 | 0.7 | Good |
| Inv. ex. | 10 | Good | None | 237 | 209 | 0.1 | 1.3 | Good |
| Inv. ex. | 11 | Good | None | 240 | 211 | 0.4 | 1.2 | Good |
| Comp. ex. | 12 | Poor | | Welding impossible | | | | Poor |
| Comp. ex. | 13 | Good | SI | 387 | 187 | 0.5 | 1.2 | Poor |

On the other hand, when using Wire No. 12 where the content of CaO was a mass % with respect to the wire total mass of 0.1%, the content of CaO was too small, so flat welding was possible, but at the other welding positions, dripping of the molten metal occurred and welding was impossible, so the result was judged not passing.

Further, when using Wire No. 13 where the content of CaO was 7.1% by mass with respect to the wire total mass, the slag fluidity became insufficient and slag inclusions were observed in the weld metal, so the result was judged not passing.

Next, the contents of CaO, $MgF_2$, $CaF_2$, $SrF_2$, and $BaF_2$ were examined using the wires described in Table 8. The test results are described in Table 9 and Table 10.

In Wire Nos. 14 to 29 where the total content of $MgF_2$, $CaF_2$, $SrF_2$, and $BaF_2$ was 1.0% or more with respect to the wire total mass and the total content of $MgF_2$, $CaF_2$, $SrF_2$, $BaF_2$, and CaO was a mass % with respect to the wire total mass of 3.0% to 12.0%, all wires were judged to be passing, that is, good results were obtained.

TABLE 8

Mass % with respect to wire total mass

| Class | Wire no. | CaO | $MgF_2$ | $CaF_2$ | $SrF_2$ | $BaF_2$ | Total of $MgF_2$, $CaF_2$, $SrF_2$, $BaF_2$ | Total of $MgF_2$, $CaF_2$, $SrF_2$, $BaF_2$, CaO |
|---|---|---|---|---|---|---|---|---|
| Inv. ex. | 14 | 2.0 | 1.0 | 0.0 | 0.0 | 0.0 | 1.0 | 3.0 |
| Inv. ex. | 15 | 2.0 | 0.0 | 1.0 | 0.0 | 0.0 | 1.0 | 3.0 |
| Inv. ex. | 16 | 2.0 | 0.0 | 0.0 | 1.0 | 0.0 | 1.0 | 3.0 |
| Inv. ex. | 17 | 2.0 | 0.0 | 0.0 | 0.0 | 1.0 | 1.0 | 3.0 |
| Inv. ex. | 18 | 2.0 | 2.0 | 0.0 | 0.0 | 0.0 | 2.0 | 4.0 |
| Inv. ex. | 19 | 2.0 | 0.0 | 3.0 | 0.0 | 0.0 | 3.0 | 5.0 |
| Inv. ex. | 20 | 2.0 | 0.0 | 3.0 | 0.0 | 1.0 | 4.0 | 6.0 |
| Inv. ex. | 21 | 2.0 | 0.0 | 5.0 | 0.0 | 0.0 | 5.0 | 7.0 |
| Inv. ex. | 22 | 2.0 | 5.5 | 0.0 | 1.0 | 0.0 | 6.5 | 8.5 |
| Inv. ex. | 23 | 2.0 | 0.0 | 8.0 | 0.0 | 0.0 | 8.0 | 10.0 |
| Inv. ex. | 24 | 2.0 | 0.0 | 0.0 | 8.5 | 0.5 | 9.0 | 11.0 |
| Inv. ex. | 25 | 2.0 | 10.0 | 0.0 | 0.0 | 0.0 | 10.0 | 12.0 |
| Inv. ex. | 26 | 2.0 | 0.0 | 10.0 | 0.0 | 0.0 | 10.0 | 12.0 |
| Inv. ex. | 27 | 2.0 | 0.0 | 0.0 | 10.0 | 0.0 | 10.0 | 12.0 |
| Inv. ex. | 28 | 2.0 | 0.0 | 0.0 | 0.0 | 10.0 | 10.0 | 12.0 |
| Inv. ex. | 29 | 2.0 | 2.0 | 3.0 | 2.0 | 3.0 | 10.0 | 12.0 |
| Comp. ex. | 30 | 2.1 | 0.9 | 0.0 | 0.0 | 0.0 | 0.9 | 3.0 |
| Comp. ex. | 31 | 1.6 | 0.0 | 1.3 | 0.0 | 0.0 | 1.3 | 2.9 |
| Comp. ex. | 32 | 2.0 | 8.0 | 0.0 | 0.0 | 2.1 | 10.1 | 12.1 |

The ingredients other than the above were as follows. The units are mass % with respect to the wire total mass.

Contents of deoxidizing metal elements

| Si | Al | Ti | Mg | Zr | Ca | Ce | La | Total |
|---|---|---|---|---|---|---|---|---|
| 0.2 | 0.1 | 0.0 | 0.0 | 0.3 | 0.0 | 0.2 | 0.0 | 0.8 |

Alloy ingredients of wire

| C | Si | Mn | P | S | Cu | Ni | Cr | Mo | V | Nb | B | α | Total of P and S |
|---|---|---|---|---|---|---|---|---|---|---|---|---|---|
| 0.06 | 0.20 | 1.26 | 0.006 | 0.006 | 0.24 | 0.00 | 0.00 | 0.64 | 0.00 | 0.00 | 0.00 | 0.18 | 0.012 |

Contents of oxides

| Si oxides | Mn oxides | Al oxides | Ti oxides | B oxides | Zr oxides | Total |
|---|---|---|---|---|---|---|
| 0.0 | 0.8 | 0.0 | 0.1 | 0.1 | 0.0 | 1.0 |

TABLE 8-continued

| Contents of carbonates | | | | |
|---|---|---|---|---|
| $MgCO_3$ | $CaCO_3$ | $SrCO_3$ | $BaCO_3$ | Total |
| 0.0 | 0.0 | 0.0 | 0.0 | 0.0 |

| Contents of MgO, BaO, SrO | | | | Contents of iron powder in flux |
|---|---|---|---|---|
| MgO | BaO | SrO | Total | Iron powder |
| 0.0 | 0.0 | 0.0 | 0.0 | 1.7 |

| Class | Inv. ex. | | | | | | | | Comp. ex. | | |
|---|---|---|---|---|---|---|---|---|---|---|---|
| Wire Nos. | 14-17 | 18 | 19 | 20 | 21 | 22 | 23 | 24 | 25-29 | 30 | 31 | 32 |
| CaO | 2.0 | 2.0 | 2.0 | 2.0 | 2.0 | 2.0 | 2.0 | 2.0 | 2.0 | 2.1 | 1.6 | 2.0 |
| Flux filling rate | 8 | 9 | 10 | 11 | 12 | 14 | 15 | 16 | 17 | 8 | 8 | 17 |

| Others | |
|---|---|
| Arc stabilizer | Slit-shaped opening in steel sheath |
| $K_2O$ contained to 0.03% | Yes |

TABLE 9

| Class | Wire no. | Bead formation | Weld defect | Weld metal oxygen amount (ppm) | Charpy test results (J) | Undercut max. depth (mm) | Spatter (g/min) | Results of evaluation |
|---|---|---|---|---|---|---|---|---|
| Flat | | | | | | | | |
| Inv. ex. | 14 | Good | None | 244 | 258 | 0.7 | 92 | Good |
| Inv. ex. | 15 | Good | None | 253 | 247 | 0.8 | 93 | Good |
| Inv. ex. | 16 | Good | None | 257 | 269 | 0.6 | 93 | Good |
| Inv. ex. | 17 | Good | None | 269 | 264 | 0.6 | 93 | Good |
| Inv. ex. | 18 | Good | None | 256 | 255 | 0.7 | 96 | Good |
| Inv. ex. | 19 | Good | None | 267 | 259 | 0.6 | 97 | Good |
| Inv. ex. | 20 | Good | None | 260 | 267 | 0.7 | 98 | Good |
| Inv. ex. | 21 | Good | None | 245 | 249 | 0.7 | 96 | Good |
| Inv. ex. | 22 | Good | None | 255 | 228 | 0.6 | 97 | Good |
| Inv. ex. | 23 | Good | None | 261 | 238 | 0.7 | 97 | Good |
| Inv. ex. | 24 | Good | None | 247 | 255 | 0.6 | 94 | Good |
| Inv. ex. | 25 | Good | None | 254 | 245 | 0.7 | 92 | Good |
| Inv. ex. | 26 | Good | None | 244 | 266 | 0.7 | 93 | Good |
| Inv. ex. | 27 | Good | None | 248 | 245 | 0.7 | 93 | Good |
| Inv. ex. | 28 | Good | None | 250 | 239 | 0.6 | 93 | Good |
| Inv. ex. | 29 | Good | None | 266 | 230 | 0.7 | 92 | Good |
| Comp. ex. | 30 | Good | SI | 402 | 125 | 0.8 | 92 | Poor |
| Comp. ex. | 31 | Good | None | 245 | 250 | 0.8 | 91 | Good |
| Comp. ex. | 32 | Good | None | 256 | 238 | 1.2 | 92 | Poor |
| Overhead | | | | | | | | |
| Inv. ex. | 14 | Good | None | 254 | 235 | 0.7 | 91 | Good |
| Inv. ex. | 15 | Good | None | 241 | 219 | 0.8 | 92 | Good |
| Inv. ex. | 16 | Good | None | 236 | 241 | 0.7 | 92 | Good |
| Inv. ex. | 17 | Good | None | 237 | 256 | 0.8 | 94 | Good |
| Inv. ex. | 18 | Good | None | 245 | 230 | 0.8 | 97 | Good |
| Inv. ex. | 19 | Good | None | 254 | 210 | 0.6 | 97 | Good |
| Inv. ex. | 20 | Good | None | 230 | 254 | 0.7 | 98 | Good |
| Inv. ex. | 21 | Good | None | 255 | 287 | 0.6 | 98 | Good |
| Inv. ex. | 22 | Good | None | 264 | 249 | 0.7 | 98 | Good |
| Inv. ex. | 23 | Good | None | 231 | 246 | 0.8 | 98 | Good |
| Inv. ex. | 24 | Good | None | 254 | 249 | 0.7 | 93 | Good |
| Inv. ex. | 25 | Good | None | 256 | 233 | 0.6 | 94 | Good |
| Inv. ex. | 26 | Good | None | 259 | 252 | 0.7 | 92 | Good |
| Inv. ex. | 27 | Good | None | 266 | 265 | 0.7 | 93 | Good |
| Inv. ex. | 28 | Good | None | 262 | 245 | 0.7 | 93 | Good |
| Inv. ex. | 29 | Good | None | 256 | 239 | 0.8 | 93 | Good |
| Comp. ex. | 30 | Good | SI | 379 | 158 | 0.9 | 92 | Poor |
| Comp. ex. | 31 | Poor | | Welding impossible | | | | Poor |
| Comp. ex. | 32 | Good | None | 266 | 254 | 1.3 | 93 | Poor |

TABLE 10

| Class | Wire no. | Bead formation | Weld defect | Weld metal oxygen amount (ppm) | Charpy test results (J) | Undercut max. depth (mm) | Spatter (g/min) | Results of evaluation |
|---|---|---|---|---|---|---|---|---|
| | | | | Vertical | | | | |
| Inv. ex. | 14 | Good | None | 247 | 214 | 0.7 | 91 | Good |
| Inv. ex. | 15 | Good | None | 245 | 254 | 0.6 | 92 | Good |
| Inv. ex. | 16 | Good | None | 254 | 235 | 0.7 | 92 | Good |
| Inv. ex. | 17 | Good | None | 265 | 239 | 0.8 | 93 | Good |
| Inv. ex. | 18 | Good | None | 257 | 287 | 0.8 | 96 | Good |
| Inv. ex. | 19 | Good | None | 261 | 244 | 0.7 | 97 | Good |
| Inv. ex. | 20 | Good | None | 252 | 245 | 0.6 | 98 | Good |
| Inv. ex. | 21 | Good | None | 241 | 263 | 0.7 | 98 | Good |
| Inv. ex. | 22 | Good | None | 235 | 248 | 0.7 | 98 | Good |
| Inv. ex. | 23 | Good | None | 235 | 271 | 0.7 | 99 | Good |
| Inv. ex. | 24 | Good | None | 258 | 255 | 0.6 | 94 | Good |
| Inv. ex. | 25 | Good | None | 251 | 223 | 0.8 | 92 | Good |
| Inv. ex. | 26 | Good | None | 259 | 225 | 0.7 | 94 | Good |
| Inv. ex. | 27 | Good | None | 249 | 241 | 0.6 | 93 | Good |
| Inv. ex. | 28 | Good | None | 266 | 258 | 0.7 | 93 | Good |
| Inv. ex. | 29 | Good | None | 261 | 241 | 0.6 | 94 | Good |
| Comp. ex. | 30 | Good | SI | 357 | 148 | 0.6 | 93 | Poor |
| Comp. ex. | 31 | Poor | | Welding impossible | | | | Poor |
| Comp. ex. | 32 | Good | None | 256 | 228 | 1.3 | 92 | Poor |
| | | | | Horizontal | | | | |
| Inv. ex. | 14 | Good | None | 253 | 235 | 0.8 | 93 | Good |
| Inv. ex. | 15 | Good | None | 248 | 245 | 0.7 | 93 | Good |
| Inv. ex. | 16 | Good | None | 236 | 230 | 0.7 | 94 | Good |
| Inv. ex. | 17 | Good | None | 247 | 278 | 0.7 | 94 | Good |
| Inv. ex. | 18 | Good | None | 260 | 287 | 0.8 | 97 | Good |
| Inv. ex. | 19 | Good | None | 238 | 245 | 0.6 | 97 | Good |
| Inv. ex. | 20 | Good | None | 247 | 251 | 0.7 | 98 | Good |
| Inv. ex. | 21 | Good | None | 251 | 267 | 0.6 | 98 | Good |
| Inv. ex. | 22 | Good | None | 244 | 235 | 0.8 | 99 | Good |
| Inv. ex. | 23 | Good | None | 256 | 233 | 0.7 | 98 | Good |
| Inv. ex. | 24 | Good | None | 259 | 241 | 0.6 | 93 | Good |
| Inv. ex. | 25 | Good | None | 268 | 250 | 0.7 | 93 | Good |
| Inv. ex. | 26 | Good | None | 235 | 277 | 0.8 | 92 | Good |
| Inv. ex. | 27 | Good | None | 245 | 245 | 0.7 | 93 | Good |
| Inv. ex. | 28 | Good | None | 258 | 225 | 0.7 | 94 | Good |
| Inv. ex. | 29 | Good | None | 263 | 247 | 0.8 | 93 | Good |
| Comp. ex. | 30 | Good | SI | 361 | 147 | 0.8 | 93 | Poor |
| Comp. ex. | 31 | Poor | | Welding impossible | | | | Poor |
| Comp. ex. | 32 | Good | None | 266 | 238 | 1.3 | 93 | Poor |

Further, in Wire Nos. 18 to 23 where the total content of $MgF_2$, $CaF_2$, $SrF_2$, and $BaF_2$ was 1.0% or more with respect to the wire total mass and where the total content of $MgF_2$, $CaF_2$, $SrF_2$, $BaF_2$, and CaO was a mass with respect to the wire total mass of 4.0% or more and 10.0% or less, the result was obtained that an effect of improvement of the bead width stability was obtained in addition to the above effects.

On the other hand, in Wire No. 30 where the total content of $MgF_2$, $CaF_2$, $SrF_2$, and $BaF_2$ was less than 1.0% with respect to the wire total mass, the solidification temperature of the slag was too high, so the fluidity of the slag became insufficient, slag inclusions were observed in the weld metal, and not only that, the passing standards of the amount of oxygen of the weld metal and the results of the Charpy test failed to be met, so the wire was not passing.

In Wire No. 31 where the total content of $MgF_2$, $CaF_2$, $SrF_2$, $BaF_2$, and CaO was less than 3.0% with respect to the wire total mass, the amount of slag was insufficient, so while flat welding was possible at other welding positions, the molten metal dripped and welding was impossible, so the wire was not passing.

In Wire No. 32 where the total content of $MgF_2$, $CaF_2$, $SrF_2$, $BaF_2$, and CaO exceeded 12.0% with respect to the wire total mass, the amount of slag was excessive and the molten pool was unstable. As a result, the amount of generation of fumes at the time of welding did not meet the passing standards, so the wire was not passing.

Next, the content of deoxidizing metal elements was examined using wires of Table 11. The test results are shown in Table 12 and Table 13.

In Wire Nos. 33 to 53 where the content of Al was a mass % with respect to the wire total mass of less than 0.3% and where the total content of Si, Al, Ti, Mg, Zr, Ca, Ce, and La was a mass % with respect to the wire total mass of 0.2% or more and 2.0% or less, all wires were judged passing, that is, good results were obtained.

TABLE 11

| | | Mass % with respect to wire total mass | | | | | | | | | |
|---|---|---|---|---|---|---|---|---|---|---|---|
| Class | Wire no. | Si | Al | Ti | Mg | Zr | Ca | Ce | La | Total of deoxidizing metal elements | α |
| Inv. ex. | 33 | 0.2 | 0.0 | 0.0 | 0.0 | 0.0 | 0.0 | 0.0 | 0.0 | 0.2 | 0.34 |
| Inv. ex. | 34 | 0.1 | 0.1 | 0.0 | 0.0 | 0.0 | 0.0 | 0.0 | 0.0 | 0.2 | 0.34 |
| Inv. ex. | 35 | 0.1 | 0.0 | 0.1 | 0.0 | 0.0 | 0.0 | 0.0 | 0.0 | 0.2 | 0.34 |
| Inv. ex. | 36 | 0.1 | 0.0 | 0.0 | 0.1 | 0.0 | 0.0 | 0.0 | 0.0 | 0.2 | 0.34 |
| Inv. ex. | 37 | 0.1 | 0.0 | 0.0 | 0.0 | 0.1 | 0.0 | 0.0 | 0.0 | 0.2 | 0.34 |
| Inv. ex. | 38 | 0.1 | 0.0 | 0.0 | 0.0 | 0.0 | 0.1 | 0.0 | 0.0 | 0.2 | 0.34 |
| Inv. ex. | 39 | 0.1 | 0.0 | 0.0 | 0.0 | 0.0 | 0.0 | 0.1 | 0.0 | 0.2 | 0.34 |
| Inv. ex. | 40 | 0.1 | 0.0 | 0.0 | 0.0 | 0.0 | 0.0 | 0.0 | 0.1 | 0.2 | 0.34 |
| Inv. ex. | 41 | 0.3 | 0.0 | 0.1 | 0.1 | 0.0 | 0.0 | 0.0 | 0.1 | 0.6 | 0.34 |
| Inv. ex. | 42 | 0.4 | 0.1 | 0.1 | 0.3 | 0.0 | 0.0 | 0.0 | 0.1 | 1.0 | 0.35 |
| Inv. ex. | 43 | 0.5 | 0.0 | 0.1 | 0.4 | 0.0 | 0.0 | 0.0 | 0.0 | 1.0 | 0.35 |
| Inv. ex. | 44 | 0.1 | 0.2 | 0.1 | 0.2 | 0.3 | 0.2 | 0.1 | 0.3 | 1.5 | 0.34 |
| Inv. ex. | 45 | 0.3 | 0.0 | 0.1 | 0.1 | 0.8 | 0.2 | 0.0 | 0.3 | 1.8 | 0.34 |
| Inv. ex. | 46 | 2.0 | 0.0 | 0.0 | 0.0 | 0.0 | 0.0 | 0.0 | 0.0 | 2.0 | 0.40 |
| Inv. ex. | 47 | 0.1 | 0.0 | 1.9 | 0.0 | 0.0 | 0.0 | 0.0 | 0.0 | 2.0 | 0.34 |
| Inv. ex. | 48 | 0.1 | 0.0 | 0.0 | 1.9 | 0.0 | 0.0 | 0.0 | 0.0 | 2.0 | 0.34 |
| Inv. ex. | 49 | 0.1 | 0.0 | 0.0 | 0.0 | 1.9 | 0.0 | 0.0 | 0.0 | 2.0 | 0.34 |
| Inv. ex. | 50 | 0.1 | 0.0 | 0.0 | 0.0 | 0.0 | 1.9 | 0.0 | 0.0 | 2.0 | 0.34 |
| Inv. ex. | 51 | 0.1 | 0.0 | 0.0 | 0.0 | 0.0 | 0.0 | 1.9 | 0.0 | 2.0 | 0.34 |
| Inv. ex. | 52 | 0.1 | 0.0 | 0.0 | 0.0 | 0.0 | 0.0 | 0.0 | 1.9 | 2.0 | 0.34 |
| Inv. ex. | 53 | 0.3 | 0.2 | 0.3 | 0.2 | 0.3 | 0.2 | 0.3 | 0.2 | 2.0 | 0.34 |
| Comp. ex. | 54 | 0.1 | 0.3 | 0.1 | 0.2 | 0.3 | 0.0 | 0.1 | 0.3 | 1.4 | 0.34 |
| Comp. ex. | 55 | 0.1 | 0.0 | 0.0 | 0.0 | 0.0 | 0.0 | 0.0 | 0.0 | 0.1 | 0.34 |
| Comp. ex. | 56 | 0.3 | 0.2 | 0.3 | 0.2 | 0.3 | 0.2 | 0.3 | 0.3 | 2.1 | 0.34 |

The ingredients other than the above were as follows. The units are mass % with respect to the wire total mass.

Contents of CaO

| CaO |
|---|
| 2.4 |

Contents of fluorides

| $MgF_2$ | $CaF_2$ | $SrF_2$ | $BaF_2$ | Total of fluorides |
|---|---|---|---|---|
| 0.0 | 0.0 | 5.3 | 0.0 | 5.3 |

Total of CaO, $MgF_2$, $CaF_2$, $SrF_2$, $BaF_2$
7.7

Alloy ingredients of wire

| C | Mn | P | S | Cu | Ni | Cr | Mo | V | Nb | B | Total of P and S |
|---|---|---|---|---|---|---|---|---|---|---|---|
| 0.06 | 0.97 | 0.006 | 0.006 | 0.00 | 0.48 | 0.00 | 0.24 | 0.00 | 0.00 | 0.04 | 0.012 |

Contents of oxides

| Si oxides | Mn oxides | Al oxides | Ti oxides | B oxides | Zr oxides | Total |
|---|---|---|---|---|---|---|
| 0.0 | 0.0 | 0.0 | 0.5 | 0.0 | 0.1 | 0.6 |

Contents of carbonates

| $MgCO_3$ | $CaCO_3$ | $SrCO_3$ | $BaCO_3$ | Total |
|---|---|---|---|---|
| 0.0 | 0.0 | 0.0 | 0.0 | 0.0 |

Contents of MgO

| MgO | BaO | SrO | Total |
|---|---|---|---|
| 0.0 | 0.0 | 0.0 | 0.0 |

Contents of iron powder in flux

| Iron powder |
|---|
| 2.4 |

| Class | Inv. ex. | | | | | | Comp. ex. | | |
|---|---|---|---|---|---|---|---|---|---|
| Wire Nos. | 33-40 | 41 | 42-43 | 44 | 45 | 46-53 | 54 | 55 | 56 |
| Flux filling rate | 12 | 13 | 13 | 13 | 14 | 14 | 13 | 12 | 14 |

Others

| Arc stabilizer | Slit-shaped opening in steel sheath |
|---|---|
| $K_2O$ contained to 0.03% | Yes |

TABLE 12

| Class | Wire no. | Bead formation | Weld defect | Weld metal oxygen amount (ppm) | Charpy test results (J) | Undercut max. depth (mm) |
|---|---|---|---|---|---|---|
| Flat | | | | | | |
| Inv. ex. | 33 | Good | None | 258 | 207 | Good |
| Inv. ex. | 34 | Good | None | 268 | 213 | Good |
| Inv. ex. | 35 | Good | None | 259 | 220 | Good |
| Inv. ex. | 36 | Good | None | 268 | 205 | Good |
| Inv. ex. | 37 | Good | None | 261 | 214 | Good |
| Inv. ex. | 38 | Good | None | 258 | 220 | Good |
| Inv. ex. | 39 | Good | None | 267 | 231 | Good |
| Inv. ex. | 40 | Good | None | 250 | 267 | Good |
| Inv. ex. | 41 | Good | None | 241 | 247 | Good |
| Inv. ex. | 42 | Good | None | 233 | 256 | Good |
| Inv. ex. | 43 | Good | None | 230 | 255 | Good |
| Inv. ex. | 44 | Good | None | 226 | 241 | Good |
| Inv. ex. | 45 | Good | None | 220 | 239 | Good |
| Inv. ex. | 46 | Good | None | 217 | 254 | Good |
| Inv. ex. | 47 | Good | None | 215 | 258 | Good |
| Inv. ex. | 48 | Good | None | 216 | 244 | Good |
| Inv. ex. | 49 | Good | None | 218 | 289 | Good |
| Inv. ex. | 50 | Good | None | 210 | 278 | Good |
| Inv. ex. | 51 | Good | None | 217 | 269 | Good |
| Inv. ex. | 52 | Good | None | 205 | 270 | Good |
| Inv. ex. | 53 | Good | None | 219 | 265 | Good |
| Comp. ex. | 54 | Good | None | 240 | 156 | Poor |
| Comp. ex. | 55 | Good | BH | 323 | 189 | Poor |
| Comp. ex. | 56 | Good | None | 205 | 165 | Poor |
| Overhead | | | | | | |
| Inv. ex. | 33 | Good | None | 265 | 209 | Good |
| Inv. ex. | 34 | Good | None | 268 | 217 | Good |
| Inv. ex. | 35 | Good | None | 245 | 222 | Good |
| Inv. ex. | 36 | Good | None | 255 | 216 | Good |
| Inv. ex. | 37 | Good | None | 269 | 218 | Good |
| Inv. ex. | 38 | Good | None | 256 | 220 | Good |
| Inv. ex. | 39 | Good | None | 255 | 231 | Good |
| Inv. ex. | 40 | Good | None | 264 | 214 | Good |
| Inv. ex. | 41 | Good | None | 256 | 245 | Good |
| Inv. ex. | 42 | Good | None | 247 | 261 | Good |
| Inv. ex. | 43 | Good | None | 230 | 256 | Good |
| Inv. ex. | 44 | Good | None | 224 | 266 | Good |
| Inv. ex. | 45 | Good | None | 220 | 272 | Good |
| Inv. ex. | 46 | Good | None | 218 | 285 | Good |
| Inv. ex. | 47 | Good | None | 214 | 285 | Good |
| Inv. ex. | 48 | Good | None | 210 | 260 | Good |
| Inv. ex. | 49 | Good | None | 204 | 280 | Good |
| Inv. ex. | 50 | Good | None | 209 | 278 | Good |
| Inv. ex. | 51 | Good | None | 210 | 269 | Good |
| Inv. ex. | 52 | Good | None | 214 | 264 | Good |
| Inv. ex. | 53 | Good | None | 220 | 271 | Good |
| Comp. ex. | 54 | Good | None | 240 | 145 | Poor |
| Comp. ex. | 55 | Good | BH | 354 | 172 | Poor |
| Comp. ex. | 56 | Good | None | 210 | 178 | Poor |

TABLE 13

| Class | Wire no. | Bead formation | Weld defect | Weld metal oxygen amount (ppm) | Charpy test results (J) | Undercut max. depth (mm) |
|---|---|---|---|---|---|---|
| Vertical | | | | | | |
| Inv. ex. | 33 | Good | None | 265 | 220 | Good |
| Inv. ex. | 34 | Good | None | 258 | 208 | Good |
| Inv. ex. | 35 | Good | None | 255 | 200 | Good |
| Inv. ex. | 36 | Good | None | 277 | 210 | Good |
| Inv. ex. | 37 | Good | None | 260 | 257 | Good |
| Inv. ex. | 38 | Good | None | 245 | 232 | Good |
| Inv. ex. | 39 | Good | None | 268 | 244 | Good |
| Inv. ex. | 40 | Good | None | 269 | 205 | Good |
| Inv. ex. | 41 | Good | None | 251 | 214 | Good |
| Inv. ex. | 42 | Good | None | 243 | 222 | Good |
| Inv. ex. | 43 | Good | None | 234 | 245 | Good |
| Inv. ex. | 44 | Good | None | 220 | 264 | Good |
| Inv. ex. | 45 | Good | None | 217 | 208 | Good |
| Inv. ex. | 46 | Good | None | 220 | 254 | Good |
| Inv. ex. | 47 | Good | None | 215 | 254 | Good |
| Inv. ex. | 48 | Good | None | 213 | 254 | Good |
| Inv. ex. | 49 | Good | None | 220 | 279 | Good |
| Inv. ex. | 50 | Good | None | 218 | 256 | Good |
| Inv. ex. | 51 | Good | None | 215 | 245 | Good |
| Inv. ex. | 52 | Good | None | 208 | 255 | Good |
| Inv. ex. | 53 | Good | None | 220 | 257 | Good |
| Comp. ex. | 54 | Good | None | 256 | 188 | Poor |
| Comp. ex. | 55 | Good | BH | 339 | 178 | Poor |
| Comp. ex. | 56 | Good | None | 198 | 166 | Poor |
| Horizontal | | | | | | |
| Inv. ex. | 33 | Good | None | 264 | 220 | Good |
| Inv. ex. | 34 | Good | None | 255 | 208 | Good |
| Inv. ex. | 35 | Good | None | 268 | 200 | Good |
| Inv. ex. | 36 | Good | None | 263 | 210 | Good |
| Inv. ex. | 37 | Good | None | 266 | 257 | Good |
| Inv. ex. | 38 | Good | None | 259 | 232 | Good |
| Inv. ex. | 39 | Good | None | 261 | 244 | Good |
| Inv. ex. | 40 | Good | None | 266 | 205 | Good |
| Inv. ex. | 41 | Good | None | 251 | 214 | Good |
| Inv. ex. | 42 | Good | None | 243 | 222 | Good |
| Inv. ex. | 43 | Good | None | 230 | 236 | Good |
| Inv. ex. | 44 | Good | None | 226 | 254 | Good |
| Inv. ex. | 45 | Good | None | 220 | 258 | Good |
| Inv. ex. | 46 | Good | None | 214 | 254 | Good |
| Inv. ex. | 47 | Good | None | 210 | 254 | Good |
| Inv. ex. | 48 | Good | None | 217 | 254 | Good |
| Inv. ex. | 49 | Good | None | 211 | 278 | Good |
| Inv. ex. | 50 | Good | None | 214 | 256 | Good |
| Inv. ex. | 51 | Good | None | 205 | 265 | Good |
| Inv. ex. | 52 | Good | None | 211 | 267 | Good |
| Inv. ex. | 53 | Good | None | 209 | 281 | Good |
| Comp. ex. | 54 | Good | None | 243 | 154 | Poor |
| Comp. ex. | 55 | Good | BH | 335 | 181 | Poor |
| Comp. ex. | 56 | Good | None | 217 | 183 | Poor |

On the other hand, in Wire No. 54 where the content of Al was a mass % with respect to the wire total mass of 0.3%, fine structures resulting from intragranular transformation failed to be formed, so the toughness of the weld metal did not meet the passing standards, and the wire was not passing.

Further, in Wire No. 55 where the total content of Si, Al, Ti, Mg, Zr, Ca, Ce, and La was a mass % with respect to the wire total mass of 0.1%, the deoxidation was insufficient, so blowholes formed and the wire was not passing.

Further, in Wire No. 56 where the total content of Si, Al, Ti, Mg, Zr, Ca, Ce, and La was a mass % with respect to the wire total mass of 2.1%, hard microstructures such as MAC formed in the weld metal, so the Charpy test did not meet the passing standards and the wire was not passing.

Next, as indicators of the content of alloy elements, the value of a and the total content of P and S were examined using the wires of Table 14. The test results are shown in Table 15.

In Wire Nos. 57 to 65 where the value of a was 0.15% or more and 0.40% or less and where the total content of P and S was a mass % with respect to the wire total mass of 0.040% or less, all wires were judged passing, that is, good results were obtained.

TABLE 14

Mass % with respect to wire total mass

| Class | Wire no. | C | Si | Mn | P | S | Cu | Ni | Cr | Mo | V | Nb | B | α | Total of P and S | Total of deoxidizing metal elements |
|---|---|---|---|---|---|---|---|---|---|---|---|---|---|---|---|---|
| Inv. ex. | 57 | 0.03 | 0.3 | 2.2 | 0.006 | 0.006 | 0.0 | 0.0 | 0.0 | 0.0 | 0.00 | 0.00 | 0.00 | 0.15 | 0.012 | 0.9 |
| Inv. ex. | 58 | 0.06 | 0.5 | 1.4 | 0.006 | 0.006 | 0.0 | 1.0 | 0.0 | 0.2 | 0.00 | 0.00 | 0.00 | 0.18 | 0.012 | 1.1 |
| Inv. ex. | 59 | 0.15 | 0.9 | 0.8 | 0.006 | 0.006 | 0.0 | 0.2 | 0.0 | 0.0 | 0.00 | 0.00 | 0.00 | 0.22 | 0.012 | 1.5 |
| Inv. ex. | 60 | 0.07 | 0.5 | 2.0 | 0.006 | 0.006 | 0.3 | 0.0 | 0.5 | 0.2 | 0.01 | 0.00 | 0.00 | 0.24 | 0.012 | 1.1 |
| Inv. ex. | 61 | 0.07 | 0.5 | 2.0 | 0.006 | 0.006 | 0.0 | 2.0 | 0.5 | 0.5 | 0.02 | 0.00 | 0.00 | 0.28 | 0.012 | 1.1 |
| Inv. ex. | 62 | 0.07 | 0.5 | 2.0 | 0.006 | 0.006 | 0.5 | 2.5 | 0.5 | 0.5 | 0.02 | 0.02 | 0.00 | 0.32 | 0.012 | 1.1 |
| Inv. ex. | 63 | 0.10 | 0.5 | 1.6 | 0.006 | 0.006 | 0.0 | 3.0 | 0.0 | 1.4 | 0.00 | 0.00 | 0.00 | 0.34 | 0.012 | 1.1 |
| Inv. ex. | 64 | 0.09 | 0.6 | 2.0 | 0.006 | 0.006 | 0.0 | 0.0 | 1.4 | 1.0 | 0.00 | 0.01 | 0.01 | 0.40 | 0.012 | 1.2 |
| Inv. ex. | 65 | 0.07 | 0.5 | 2.0 | 0.028 | 0.012 | 0.0 | 2.0 | 0.5 | 0.2 | 0.00 | 0.00 | 0.00 | 0.26 | 0.040 | 1.1 |
| Comp. ex. | 66 | 0.03 | 0.3 | 1.9 | 0.006 | 0.006 | 0.0 | 0.0 | 0.0 | 0.0 | 0.00 | 0.00 | 0.00 | 0.14 | 0.012 | 0.9 |
| Comp. ex. | 67 | 0.10 | 0.7 | 2.0 | 0.006 | 0.006 | 0.0 | 0.0 | 1.4 | 1.0 | 0.00 | 0.01 | 0.01 | 0.41 | 0.012 | 1.3 |
| Comp. ex. | 68 | 0.07 | 0.5 | 2.0 | 0.028 | 0.013 | 0.0 | 2.0 | 0.5 | 0.2 | 0.00 | 0.00 | 0.00 | 0.26 | 0.041 | 1.1 |

The ingredients other than the above were as follows. The units are mass % with respect to the wire total mass.

Contents of CaO | Contents of fluorides

| CaO | $MgF_2$ | $CaF_2$ | $SrF_2$ | $BaF_2$ | Total of fluorides |
|---|---|---|---|---|---|
| 3.5 | 0.6 | 0.0 | 3.9 | 0.0 | 4.5 |

Total of CaO, $MgF_2$, $CaF_2$, $SrF_2$, $BaF_2$
8.0

Contents of deoxidizing metal elements other than Si

| Al | Ti | Mg | Zr | Ca | Ce | La | Total |
|---|---|---|---|---|---|---|---|
| 0.1 | 0.1 | 0.3 | 0.0 | 0.0 | 0.0 | 0.1 | 0.6 |

Contents of oxides

| Si oxides | Mn oxides | Al oxides | Ti oxides | B oxides | Zr oxides | Total |
|---|---|---|---|---|---|---|
| 1.3 | 0.0 | 0.0 | 0.2 | 0.0 | 0.0 | 1.5 |

Contents of carbonates

| $MgCO_3$ | $CaCO_3$ | $SrCO_3$ | $BaCO_3$ | Total |
|---|---|---|---|---|
| 0.0 | 0.0 | 0.0 | 0.0 | 0.0 |

Contents of MgO, BaO, SrO | Contents of iron powder contained in flux

| MgO | MgO | MgO | Total | Iron powder |
|---|---|---|---|---|
| 0.0 | 0.0 | 0.0 | 0.0 | 1.4 |

| Class | Inv. ex. | | | | | | | | | Comp. ex. | |
|---|---|---|---|---|---|---|---|---|---|---|---|
| Wire Nos. | 57 | 58 | 59 | 60 | 61 | 62 | 63 | 64 | 65 | 66 | 67 | 68 |
| Flux filling rate | 13 | 14 | 13 | 15 | 17 | 18 | 18 | 16 | 16 | 13 | 16 | 16 |

Others

| Arc stabilizer | Slit-shaped opening in steel sheath |
|---|---|
| $K_2O$ contained to 0.03% | Yes |

TABLE 15

| Class | Wire no. | Bead formation | Weld defect | Weld metal oxygen amount (ppm) | Charpy test results (J) | Results of evaluation |
|---|---|---|---|---|---|---|
| | | | Flat | | | |
| Inv. ex. | 57 | Good | None | 241 | 247 | Good |
| Inv. ex. | 58 | Good | None | 234 | 250 | Good |
| Inv. ex. | 59 | Good | None | 256 | 236 | Good |
| Inv. ex. | 60 | Good | None | 241 | 247 | Good |
| Inv. ex. | 61 | Good | None | 269 | 245 | Good |
| Inv. ex. | 62 | Good | None | 258 | 246 | Good |

TABLE 15-continued

| Class | Wire no. | Bead formation | Weld defect | Weld metal oxygen amount (ppm) | Charpy test results (J) | Results of evaluation |
|---|---|---|---|---|---|---|
| Inv. ex. | 63 | Good | None | 240 | 263 | Good |
| Inv. ex. | 64 | Good | None | 258 | 247 | Good |
| Inv. ex. | 65 | Good | None | 261 | 253 | Good |
| Comp. ex. | 66 | Good | None | 252 | 147 | Poor |
| Comp. ex. | 67 | Good | None | 251 | 169 | Poor |
| Comp. ex. | 68 | Good | C | 258 | 154 | Poor |

Overhead

| Class | Wire no. | Bead formation | Weld defect | Weld metal oxygen amount (ppm) | Charpy test results (J) | Results of evaluation |
|---|---|---|---|---|---|---|
| Inv. ex. | 57 | Good | None | 250 | 250 | Good |
| Inv. ex. | 58 | Good | None | 249 | 234 | Good |
| Inv. ex. | 59 | Good | None | 267 | 29 | Good |
| Inv. ex. | 60 | Good | None | 258 | 242 | Good |
| Inv. ex. | 61 | Good | None | 230 | 236 | Good |
| Inv. ex. | 62 | Good | None | 241 | 241 | Good |
| Inv. ex. | 63 | Good | None | 255 | 287 | Good |
| Inv. ex. | 64 | Good | None | 259 | 260 | Good |
| Inv. ex. | 65 | Good | None | 267 | 268 | Good |
| Comp. ex. | 66 | Good | None | 249 | 179 | Poor |
| Comp. ex. | 67 | Good | None | 245 | 183 | Poor |
| Comp. ex. | 68 | Good | C | 268 | 123 | Poor |

Vertical

| Class | Wire no. | Bead formation | Weld defect | Weld metal oxygen amount (ppm) | Charpy test results (J) | Results of evaluation |
|---|---|---|---|---|---|---|
| Inv. ex. | 57 | Good | None | 249 | 244 | Good |
| Inv. ex. | 58 | Good | None | 235 | 258 | Good |
| Inv. ex. | 59 | Good | None | 262 | 263 | Good |
| Inv. ex. | 60 | Good | None | 258 | 278 | Good |
| Inv. ex. | 61 | Good | None | 265 | 265 | Good |
| Inv. ex. | 62 | Good | None | 240 | 241 | Good |
| Inv. ex. | 63 | Good | None | 259 | 250 | Good |
| Inv. ex. | 64 | Good | None | 265 | 236 | Good |
| Inv. ex. | 65 | Good | None | 231 | 237 | Good |
| Comp. ex. | 66 | Good | None | 240 | 180 | Poor |
| Comp. ex. | 67 | Good | None | 259 | 142 | Poor |
| Comp. ex. | 68 | Good | C | 258 | 132 | Poor |

Horizontal

| Class | Wire no. | Bead formation | Weld defect | Weld metal oxygen amount (ppm) | Charpy test results (J) | Results of evaluation |
|---|---|---|---|---|---|---|
| Inv. ex. | 57 | Good | None | 248 | 214 | Good |
| Inv. ex. | 58 | Good | None | 256 | 254 | Good |
| Inv. ex. | 59 | Good | None | 237 | 235 | Good |
| Inv. ex. | 60 | Good | None | 246 | 239 | Good |
| Inv. ex. | 61 | Good | None | 269 | 287 | Good |
| Inv. ex. | 62 | Good | None | 247 | 244 | Good |
| Inv. ex. | 63 | Good | None | 258 | 245 | Good |
| Inv. ex. | 64 | Good | None | 236 | 263 | Good |
| Inv. ex. | 65 | Good | None | 247 | 248 | Good |
| Comp. ex. | 66 | Good | None | 286 | 175 | Poor |
| Comp. ex. | 67 | Good | None | 258 | 168 | Poor |
| Comp. ex. | 68 | Good | C | 249 | 145 | Poor |

On the other hand, in Wire No. 66 where the value of α was 0.14, the hardenability was insufficient, so coarse microstructures such as grain boundary ferrite or ferrite side plates were formed and the toughness of the weld metal failed to meet the passing standard, so the wire was not passing.

Further, in Wire No. 67 where the value of α was 0.41, the hardenability was excessive, so hard microstructures such as martensite formed and the toughness of the weld metal failed to meet the passing standard, so the wire was not passing.

Further, in Wire No. 68 where the total content of P and S was a mass % with respect to the wire total mass of 0.041%, high temperature cracks occurred in the weld metal and the Charpy test also failed to meet the passing standard, so the wire was not passing.

Next, the total content of Si oxides, Mn oxides, Al oxides, Ti oxides, B oxides, and Zr oxides was examined using the wires of Table 16. The results are shown in Table 17 and Table 18.

In Wire Nos. 69 to 84 and 149 to 151 where the total content of Si oxides, Mn oxides, Al oxides, Ti oxides, B oxides, and Zr oxides was a mass % with respect to the wire total mass of 0.2% or more and 3.0% or less, all wires were judged passing, that is, good results were obtained.

TABLE 16

| Class | Wire nos. | Mass % with respect to wire total mass | | | | | | | Flux filling rate (mass %) |
|---|---|---|---|---|---|---|---|---|---|
| | | Si oxides | Mn oxides | Al oxides | Ti oxides | B oxides | Zr oxides | Total of oxides | |
| Inv. ex. | 69 | 0.2 | 0.0 | 0.0 | 0.0 | 0.0 | 0.0 | 0.2 | 12 |
| Inv. ex. | 70 | 0.0 | 0.2 | 0.0 | 0.0 | 0.0 | 0.0 | 0.2 | 12 |
| Inv. ex. | 71 | 0.0 | 0.0 | 0.2 | 0.0 | 0.0 | 0.0 | 0.2 | 12 |
| Inv. ex. | 72 | 0.0 | 0.0 | 0.0 | 0.2 | 0.0 | 0.0 | 0.2 | 12 |
| Inv. ex. | 73 | 0.0 | 0.0 | 0.0 | 0.0 | 0.2 | 0.0 | 0.2 | 12 |
| Inv. ex. | 74 | 0.0 | 0.2 | 0.2 | 0.0 | 0.1 | 0.0 | 0.5 | 12 |
| Inv. ex. | 75 | 0.1 | 0.3 | 0.2 | 0.1 | 0.0 | 0.0 | 0.7 | 13 |
| Inv. ex. | 76 | 0.8 | 0.0 | 0.0 | 0.1 | 0.1 | 0.0 | 1.0 | 13 |
| Inv. ex. | 77 | 0.0 | 0.0 | 1.0 | 0.0 | 0.5 | 0.0 | 1.5 | 13 |
| Inv. ex. | 78 | 0.4 | 0.6 | 0.4 | 0.4 | 0.4 | 0.0 | 2.2 | 14 |
| Inv. ex. | 79 | 0.7 | 0.5 | 0.7 | 0.7 | 0.3 | 0.0 | 2.9 | 15 |
| Inv. ex. | 80 | 3.0 | 0.0 | 0.0 | 0.0 | 0.0 | 0.0 | 3.0 | 15 |
| Inv. ex. | 81 | 0.0 | 3.0 | 0.0 | 0.0 | 0.0 | 0.0 | 3.0 | 15 |
| Inv. ex. | 82 | 0.0 | 0.0 | 3.0 | 0.0 | 0.0 | 0.0 | 3.0 | 15 |
| Inv. ex. | 83 | 0.0 | 0.0 | 0.0 | 3.0 | 0.0 | 0.0 | 3.0 | 15 |
| Inv. ex. | 84 | 0.0 | 0.0 | 0.0 | 0.0 | 3.0 | 0.0 | 3.0 | 15 |
| Inv. ex. | 149 | 0.0 | 0.0 | 0.0 | 0.0 | 0.0 | 0.2 | 0.2 | 12 |
| Inv. ex. | 150 | 0.0 | 0.0 | 0.0 | 0.0 | 0.0 | 3.0 | 3.0 | 15 |
| Inv. ex. | 151 | 0.5 | 0.0 | 0.7 | 0.1 | 0.0 | 0.2 | 1.5 | 13 |
| Comp. ex. | 85 | 0.1 | 0.0 | 0.0 | 0.0 | 0.0 | 0.0 | 0.1 | 12 |

TABLE 16-continued

| | | | | | | | | | |
|---|---|---|---|---|---|---|---|---|---|
| Comp. ex. | 86 | 0.7 | 0.4 | 0.8 | 0.7 | 0.5 | 0.0 | 3.1 | 15 |
| Comp. ex. | 152 | 0.7 | 0.4 | 0.8 | 0.2 | 0.5 | 0.5 | 3.1 | 15 |

The ingredients other than the above were as follows. The units are mass % with respect to the wire total mass.

Contents of CaO

| CaO |
|---|
| 2.4 |

Contents of fluorides

| $MgF_2$ | $CaF_2$ | $SrF_2$ | $BaF_2$ | Total of fluorides |
|---|---|---|---|---|
| 0.0 | 2.4 | 0.0 | 0.0 | 2.4 |

Total of CaO, $MgF_2$, $CaF_2$, $SrF_2$, $BaF_2$
4.8

Contents of deoxidizing metal elements

| Si | Al | Ti | Mg | Zr | Ca | Ce | La | Total |
|---|---|---|---|---|---|---|---|---|
| 0.5 | 0.0 | 0.1 | 0.0 | 0.0 | 0.1 | 0.1 | 0.4 | 1.2 |

Alloy ingredients of wire

| C | Si | Mn | P | S | Cu | Ni | Cr | Mo | V | Nb | B | α | Total of P and S |
|---|---|---|---|---|---|---|---|---|---|---|---|---|---|
| 0.11 | 0.50 | 1.88 | 0.013 | 0.016 | 0.48 | 2.16 | 0.36 | 0.18 | 0.01 | 0.01 | 0.01 | 0.36 | 0.029 |

Contents of carbonates

| $MgCO_3$ | $CaCO_3$ | $SrCO_3$ | $BaCO_3$ | Total |
|---|---|---|---|---|
| 0.0 | 0.0 | 0.0 | 0.0 | 0.0 |

Contents of MgO, BaO, SrO

| MgO | BaO | SrO | Total |
|---|---|---|---|
| 0.0 | 0.0 | 0.0 | 0.0 |

Contents of iron powder in flux

| Iron powder |
|---|
| 1.2 |

Others

| Arc stabilizer | Slit-shaped opening in steel sheath |
|---|---|
| $K_2O$ contained to 0.03% | Yes |

TABLE 17

| Class | Wire no. | Bead formation | Weld defect | Weld metal oxygen amount (ppm) | Charpy test results (J) | Bead offset (Y) (mm) | Results of evaluation |
|---|---|---|---|---|---|---|---|
| Flat |
| Inv. ex. | 69 | Good | None | 254 | 214 | 0.2 | Good |
| Inv. ex. | 70 | Good | None | 245 | 254 | 0.2 | Good |
| Inv. ex. | 71 | Good | None | 254 | 235 | 0.2 | Good |
| Inv. ex. | 72 | Good | None | 214 | 287 | 0.2 | Good |
| Inv. ex. | 73 | Good | None | 266 | 244 | 0.1 | Good |
| Inv. ex. | 74 | Good | None | 232 | 245 | 0.1 | Good |
| Inv. ex. | 75 | Good | None | 252 | 263 | 0.2 | Good |
| Inv. ex. | 76 | Good | None | 235 | 248 | 0.2 | Good |
| Inv. ex. | 77 | Good | None | 245 | 271 | 0.2 | Good |
| Inv. ex. | 78 | Good | None | 256 | 223 | 0.1 | Good |
| Inv. ex. | 79 | Good | None | 250 | 256 | 0.2 | Good |
| Inv. ex. | 80 | Good | None | 245 | 245 | 0.1 | Good |
| Inv. ex. | 81 | Good | None | 258 | 241 | 0.2 | Good |
| Inv. ex. | 82 | Good | None | 259 | 243 | 0.1 | Good |
| Inv. ex. | 83 | Good | None | 254 | 240 | 0.1 | Good |
| Inv. ex. | 84 | Good | None | 263 | 239 | 0.1 | Good |
| Inv. ex. | 149 | Good | None | 258 | 214 | 0.1 | Good |
| Inv. ex. | 150 | Good | None | 245 | 225 | 0.1 | Good |
| Inv. ex. | 151 | Good | None | 259 | 241 | 0.1 | Good |
| Comp. ex. | 85 | Good | None | 215 | 263 | 1.2 | Poor |
| Comp. ex. | 86 | Good | None | 366 | 123 | 0.3 | Poor |
| Comp. ex. | 152 | Good | None | 354 | 149 | 0.3 | Poor |
| Overhead |
| Inv. ex. | 69 | Good | None | 255 | 214 | 0.2 | Good |
| Inv. ex. | 70 | Good | None | 249 | 254 | 0.1 | Good |
| Inv. ex. | 71 | Good | None | 263 | 235 | 0.1 | Good |
| Inv. ex. | 72 | Good | None | 241 | 287 | 0.2 | Good |
| Inv. ex. | 73 | Good | None | 243 | 244 | 0.2 | Good |
| Inv. ex. | 74 | Good | None | 262 | 245 | 0.1 | Good |
| Inv. ex. | 75 | Good | None | 230 | 263 | 0.2 | Good |
| Inv. ex. | 76 | Good | None | 244 | 214 | 0.2 | Good |
| Inv. ex. | 77 | Good | None | 260 | 254 | 0.1 | Good |
| Inv. ex. | 78 | Good | None | 254 | 235 | 0.1 | Good |
| Inv. ex. | 79 | Good | None | 239 | 239 | 0.2 | Good |
| Inv. ex. | 80 | Good | None | 265 | 241 | 0.3 | Good |
| Inv. ex. | 81 | Good | None | 248 | 236 | 0.2 | Good |
| Inv. ex. | 82 | Good | None | 246 | 247 | 0.1 | Good |
| Inv. ex. | 83 | Good | None | 262 | 241 | 0.1 | Good |
| Inv. ex. | 84 | Good | None | 241 | 252 | 0.1 | Good |
| Inv. ex. | 149 | Good | None | 269 | 209 | 0.1 | Good |
| Inv. ex. | 150 | Good | None | 268 | 236 | 0.1 | Good |
| Inv. ex. | 151 | Good | None | 244 | 225 | 0.1 | Good |
| Inv. ex. | 153 | Good | None | 260 | 211 | 0.1 | Good |
| Inv. ex. | 154 | Good | None | 271 | 225 | 0.1 | Good |
| Inv. ex. | 155 | Good | None | 243 | 217 | 0.1 | Good |
| Comp. ex. | 85 | Good | None | 255 | 279 | 1.3 | Poor |
| Comp. ex. | 86 | Good | None | 355 | 113 | 0.3 | Poor |
| Comp. ex. | 152 | Good | None | 335 | 147 | 0.3 | Poor |

TABLE 18

| Class | Wire no. | Bead formation | Weld defect | Weld metal oxygen amount (ppm) | Charpy test results (J) | Bead offset (Y) (mm) | Results of evaluation |
|---|---|---|---|---|---|---|---|
| Vertical | | | | | | | |
| Inv. ex. | 69 | Good | None | 245 | 214 | 0.2 | Good |
| Inv. ex. | 70 | Good | None | 231 | 254 | 0.1 | Good |
| Inv. ex. | 71 | Good | None | 259 | 235 | 0.2 | Good |
| Inv. ex. | 72 | Good | None | 257 | 287 | 0.1 | Good |
| Inv. ex. | 73 | Good | None | 265 | 244 | 0.1 | Good |
| Inv. ex. | 74 | Good | None | 247 | 245 | 0.1 | Good |
| Inv. ex. | 75 | Good | None | 259 | 263 | 0.2 | Good |
| Inv. ex. | 76 | Good | None | 240 | 248 | 0.2 | Good |
| Inv. ex. | 77 | Good | None | 239 | 271 | 0.1 | Good |
| Inv. ex. | 78 | Good | None | 255 | 214 | 0.1 | Good |
| Inv. ex. | 79 | Good | None | 245 | 254 | 0.2 | Good |
| Inv. ex. | 80 | Good | None | 254 | 235 | 0.2 | Good |
| Inv. ex. | 81 | Good | None | 249 | 239 | 0.1 | Good |
| Inv. ex. | 82 | Good | None | 255 | 256 | 0.1 | Good |
| Inv. ex. | 83 | Good | None | 263 | 237 | 0.1 | Good |
| Inv. ex. | 84 | Good | None | 261 | 235 | 0.2 | Good |
| Inv. ex. | 149 | Good | None | 247 | 225 | 0.1 | Good |
| Inv. ex. | 150 | Good | None | 265 | 247 | 0.1 | Good |
| Inv. ex. | 151 | Good | None | 257 | 230 | 0.1 | Good |
| Comp. ex. | 85 | Good | None | 262 | 270 | 1.3 | Poor |
| Comp. ex. | 86 | Good | None | 369 | 168 | 0.4 | Poor |
| Comp. ex. | 152 | Good | None | 369 | 177 | 0.3 | Poor |
| Horizontal | | | | | | | |
| Inv. ex. | 69 | Good | None | 249 | 214 | 0.2 | Good |
| Inv. ex. | 70 | Good | None | 251 | 254 | 0.2 | Good |
| Inv. ex. | 71 | Good | None | 255 | 235 | 0.1 | Good |
| Inv. ex. | 72 | Good | None | 241 | 287 | 0.1 | Good |
| Inv. ex. | 73 | Good | None | 246 | 244 | 0.2 | Good |
| Inv. ex. | 74 | Good | None | 232 | 245 | 0.2 | Good |
| Inv. ex. | 75 | Good | None | 254 | 263 | 0.2 | Good |
| Inv. ex. | 76 | Good | None | 258 | 214 | 0.2 | Good |
| Inv. ex. | 77 | Good | None | 245 | 254 | 0.2 | Good |
| Inv. ex. | 78 | Good | None | 254 | 235 | 0.1 | Good |
| Inv. ex. | 79 | Good | None | 252 | 239 | 0.2 | Good |
| Inv. ex. | 80 | Good | None | 261 | 245 | 0.1 | Good |
| Inv. ex. | 81 | Good | None | 244 | 223 | 0.1 | Good |
| Inv. ex. | 82 | Good | None | 263 | 218 | 0.2 | Good |
| Inv. ex. | 83 | Good | None | 231 | 231 | 0.1 | Good |
| Inv. ex. | 84 | Good | None | 246 | 229 | 0.2 | Good |
| Inv. ex. | 149 | Good | None | 258 | 241 | 0.1 | Good |
| Inv. ex. | 150 | Good | None | 247 | 258 | 0.1 | Good |
| Inv. ex. | 151 | Good | None | 268 | 277 | 0.1 | Good |
| Inv. ex. | 153 | Good | None | 262 | 225 | 0.1 | Good |
| Inv. ex. | 154 | Good | None | 240 | 235 | 0.1 | Good |
| Inv. ex. | 155 | Good | None | 254 | 249 | 0.1 | Good |
| Comp. ex. | 85 | Good | None | 248 | 277 | 1.3 | Poor |
| Comp. ex. | 86 | Good | None | 347 | 151 | 0.4 | Poor |
| Comp. ex. | 152 | Good | None | 388 | 142 | 0.3 | Poor |

On the other hand, in Wire No. 85 where the total content of the Si oxides, Mn oxides, Al oxides, Fe oxides, Ti oxides, B oxides, and Zr oxides was a mass % with respect to the wire total mass of 0.1%, the slag covering become uneven and the bead offset failed to satisfy the passing standard, so the wire was not passing.

Further, in Wire Nos. 86 and 152 where the total content of Si oxides, Mn oxides, Al oxides, Ti oxides, B oxides, and Zr oxides was a mass % with respect to the wire total mass of 3.1%, the amount of oxygen of the weld metal and the Charpy test did not meet the passing standards, so the wires were not passing.

Next, the content of iron powder which is contained in the flux was examined using the wires of Table 19. The test results are shown in Table 20 and Table 21.

In Wire Nos. 87 to 95 where the content of the iron powder in the flux was a mass % with respect to the wire total mass of 5.0% or less, all of the wires were judged as passing, that is, good results were obtained.

TABLE 19

| Class | Wire Nos. | Mass % with respect to wire total mass Content of iron powder in flux | Flux filling rate (mass %) |
|---|---|---|---|
| Inv. ex. | 87 | 0.0 | 12 |
| Inv. ex. | 88 | 0.7 | 13 |
| Inv. ex. | 89 | 1.4 | 13 |
| Inv. ex. | 90 | 2.1 | 14 |
| Inv. ex. | 91 | 2.4 | 14 |
| Inv. ex. | 92 | 3.0 | 15 |
| Inv. ex. | 93 | 3.7 | 16 |
| Inv. ex. | 94 | 4.4 | 16 |
| Inv. ex. | 95 | 5.0 | 17 |
| Comp. ex. | 96 | 5.1 | 17 |

The ingredients other than the above were as follows. The units are mass % with respect to the wire total mass.

Contents of CaO

| CaO |
|---|
| 1.2 |

Contents of fluorides

| $MgF_2$ | $CaF_2$ | $SrF_2$ | $BaF_2$ | Total of fluorides |
|---|---|---|---|---|
| 0.0 | 2.6 | 0.0 | 0.0 | 2.6 |

Total of CaO, $MgF_2$, $CaF_2$, $SrF_2$, $BaF_2$
3.8

Contents of deoxidizing metal elements

| Si | Al | Ti | Mg | Zr | Ca | Ce | La | Total |
|---|---|---|---|---|---|---|---|---|
| 0.4 | 0.0 | 0.1 | 0.0 | 0.0 | 0.2 | 0.1 | 0.4 | 1.2 |

TABLE 19-continued

Alloy ingredients of wire

| C | Si | Mn | P | S | Cu | Ni | Cr | Mo | V | Nb | B | α | Total of P and S |
|---|---|---|---|---|---|---|---|---|---|---|---|---|---|
| 0.11 | 0.40 | 2.26 | 0.006 | 0.006 | 0.00 | 2.16 | 0.00 | 0.18 | 0.00 | 0.00 | 0.01 | 0.33 | 0.012 |

Contents of oxides

| Si oxides | Mn oxides | Al oxides | Ti oxides | B oxides | Zr oxides | Total |
|---|---|---|---|---|---|---|
| 0.4 | 1.1 | 1.0 | 0.2 | 0.1 | 0.0 | 2.8 |

Contents of carbonates

| $MgCO_3$ | $CaCO_3$ | $SrCO_3$ | $BaCO_3$ | Total |
|---|---|---|---|---|
| 0.0 | 0.0 | 0.0 | 0.0 | 0.0 |

Contents of MgO, BaO, SrO

| MgO | MgO | MgO | Total |
|---|---|---|---|
| 0.0 | 0.0 | 0.0 | 0.0 |

| Class | Inv. ex. | | | | | | | | Comp. ex. |
|---|---|---|---|---|---|---|---|---|---|
| Wire Nos. | 87 | 88 | 89 | 90 | 91 | 92 | 93 | 94 | 95 | 96 |
| Flux filling rate | 12 | 13 | 13 | 14 | 14 | 15 | 16 | 16 | 17 | 17 |

Others

| Arc stabilizer | Slit-shaped opening in steel sheath |
|---|---|
| $K_2O$ contained to 0.03% | Yes |

TABLE 20

| Class | Wire no. | Bead formation | Weld defect | Weld metal oxygen amount (ppm) | Charpy test results (J) | Undercut max. depth (mm) |
|---|---|---|---|---|---|---|
| Flat | | | | | | |
| Inv. ex. | 87 | Good | None | 230 | 302 | Good |
| Inv. ex. | 88 | Good | None | 241 | 289 | Good |
| Inv. ex. | 89 | Good | None | 244 | 274 | Good |
| Inv. ex. | 90 | Good | None | 250 | 251 | Good |
| Inv. ex. | 91 | Good | None | 254 | 243 | Good |
| Inv. ex. | 92 | Good | None | 271 | 231 | Good |
| Inv. ex. | 93 | Good | None | 279 | 225 | Good |
| Inv. ex. | 94 | Good | None | 281 | 235 | Good |
| Inv. ex. | 95 | Good | None | 294 | 230 | Good |
| Comp. ex. | 96 | Good | None | 315 | 186 | Poor |
| Overhead | | | | | | |
| Inv. ex. | 87 | Good | None | 231 | 214 | Good |
| Inv. ex. | 88 | Good | None | 245 | 254 | Good |
| Inv. ex. | 89 | Good | None | 250 | 235 | Good |
| Inv. ex. | 90 | Good | None | 258 | 239 | Good |
| Inv. ex. | 91 | Good | None | 265 | 287 | Good |
| Inv. ex. | 92 | Good | None | 273 | 244 | Good |
| Inv. ex. | 93 | Good | None | 278 | 245 | Good |
| Inv. ex. | 94 | Good | None | 278 | 263 | Good |
| Inv. ex. | 95 | Good | None | 289 | 214 | Good |
| Comp. ex. | 96 | Good | None | 322 | 171 | Poor |

TABLE 21

| Class | Wire no. | Bead formation | Weld defect | Weld metal oxygen amount (ppm) | Charpy test results (J) | Undercut max. depth (mm) |
|---|---|---|---|---|---|---|
| Vertical | | | | | | |
| Inv. ex. | 87 | Good | None | 232 | 214 | Good |
| Inv. ex. | 88 | Good | None | 239 | 254 | Good |
| Inv. ex. | 89 | Good | None | 241 | 235 | Good |
| Inv. ex. | 90 | Good | None | 248 | 239 | Good |
| Inv. ex. | 91 | Good | None | 259 | 287 | Good |
| Inv. ex. | 92 | Good | None | 274 | 244 | Good |
| Inv. ex. | 93 | Good | None | 279 | 245 | Good |
| Inv. ex. | 94 | Good | None | 288 | 263 | Good |
| Inv. ex. | 95 | Good | None | 295 | 248 | Good |
| Comp. ex. | 96 | Good | None | 328 | 179 | Poor |
| Horizontal | | | | | | |
| Inv. ex. | 87 | Good | None | 235 | 214 | Good |
| Inv. ex. | 88 | Good | None | 241 | 254 | Good |
| Inv. ex. | 89 | Good | None | 249 | 235 | Good |
| Inv. ex. | 90 | Good | None | 250 | 239 | Good |
| Inv. ex. | 91 | Good | None | 256 | 287 | Good |
| Inv. ex. | 92 | Good | None | 271 | 244 | Good |
| Inv. ex. | 93 | Good | None | 275 | 245 | Good |
| Inv. ex. | 94 | Good | None | 280 | 263 | Good |
| Inv. ex. | 95 | Good | None | 297 | 214 | Good |
| Comp. ex. | 96 | Good | None | 317 | 188 | Poor |

On the other hand, in Wire No. 96 where the content of the iron powder in the flux is a mass % with respect to the wire total mass of 5.1%, the amount of oxygen of the weld metal and the results of the Charpy test did not meet the passing standards, so the result was not passing.

Next, the total content of $CaCO_3$, $MgCO_3$, $SrCO_3$, and $BaCO_3$ was examined using the wires of Table 22. The results are shown in Table 23 and Table 24.

In Wire Nos. 98 to 111 where the total content of $CaCO_3$, $MgCO_3$, $SrCO_3$, and $BaCO_3$ was a mass % with respect to the wire total mass of 0.1% or more and 4.0% or less, all of the wires were passing. An effect of improvement suppressing the large-grain spatter rate could be confirmed. Further, in Wire No. 97 where $CaCO_3$, $MgCO_3$, $SrCO_3$, and $BaCO_3$ were not contained as well, the wire was passing.

TABLE 22

| | | Mass % with respect to wire total mass | | | | | | | | | |
|---|---|---|---|---|---|---|---|---|---|---|---|
| Class | Wire Nos. | $CaCO_3$ | $BaCO_3$ | $SrCO_3$ | $MgCO_3$ | Total content of carbonates | CaO content formed by heat decomposition | BaO content formed by heat decomposition | SrO content formed by heat decomposition | MgO content formed by heat decomposition | Total content of CaO, $MgF_2$, $CaF_2$, $SrF_2$, $BaF_2$ (*1) | Total content of MgO, BaO, SrO, (*1) |
| Inv. ex. | 97 | 0.0 | 0.0 | 0.0 | 0.0 | 0.0 | 0.0 | 0.0 | 0.0 | 0.0 | 5.6 | 0.0 |
| Inv. ex. | 98 | 0.1 | 0.0 | 0.0 | 0.0 | 0.1 | 0.1 | 0.0 | 0.0 | 0.0 | 5.7 | 0.0 |
| Inv. ex. | 99 | 0.0 | 0.1 | 0.0 | 0.0 | 0.1 | 0.0 | 0.1 | 0.0 | 0.0 | 5.6 | 0.1 |
| Inv. ex. | 100 | 0.0 | 0.0 | 0.1 | 0.0 | 0.1 | 0.0 | 0.0 | 0.1 | 0.0 | 5.6 | 0.1 |
| Inv. ex. | 101 | 0.0 | 0.0 | 0.0 | 0.1 | 0.1 | 0.0 | 0.0 | 0.0 | 0.0 | 5.6 | 0.0 |
| Inv. ex. | 102 | 0.3 | 0.2 | 0.0 | 0.2 | 0.7 | 0.2 | 0.2 | 0.0 | 0.1 | 5.8 | 0.3 |
| Inv. ex. | 103 | 0.7 | 0.3 | 0.2 | 0.2 | 1.4 | 0.4 | 0.2 | 0.1 | 0.1 | 6.0 | 0.5 |
| Inv. ex. | 104 | 0.5 | 1.3 | 0.5 | 0.0 | 2.3 | 0.3 | 1.0 | 0.4 | 0.0 | 5.9 | 1.4 |
| Inv. ex. | 105 | 0.0 | 0.5 | 0.9 | 1.6 | 3.0 | 0.0 | 0.4 | 0.6 | 0.8 | 5.6 | 1.8 |
| Inv. ex. | 106 | 1.8 | 0.6 | 1.2 | 0.0 | 3.6 | 1.0 | 0.5 | 0.8 | 0.0 | 6.6 | 1.3 |
| Inv. ex. | 107 | 4.0 | 0.0 | 0.0 | 0.0 | 4.0 | 2.2 | 0.0 | 0.0 | 0.0 | 7.8 | 0.0 |
| Inv. ex. | 108 | 0.0 | 4.0 | 0.0 | 0.0 | 4.0 | 0.0 | 3.1 | 0.0 | 0.0 | 5.6 | 3.1 |
| Inv. ex. | 109 | 0.0 | 0.0 | 4.0 | 0.0 | 4.0 | 0.0 | 0.0 | 2.8 | 0.0 | 5.6 | 2.8 |
| Inv. ex. | 110 | 0.0 | 0.0 | 0.0 | 4.0 | 4.0 | 0.0 | 0.0 | 0.0 | 1.9 | 5.6 | 1.9 |
| Inv. ex. | 111 | 1.5 | 1.4 | 0.7 | 0.4 | 4.0 | 0.8 | 1.1 | 0.5 | 0.2 | 6.4 | 1.8 |
| Comp. ex. | 112 | 1.5 | 1.5 | 0.7 | 0.4 | 4.1 | 0.8 | 1.2 | 0.5 | 0.2 | 6.4 | 1.9 |

(*1): Sum of mass arising due to heat decomposition of carbonates
The ingredients other than the above were as follows. The units are mass % with respect to the wire total mass.

Amount of CaO contained from start in form of CaO

| | | | | | |
|---|---|---|---|---|---|
| CaO | | | Content of fluorides | | |
| 2.0 | | | | | |
| CaO | $MgF_2$ | $CaF_2$ | $SrF_2$ | $BaF_2$ | Total of fluorides |
| 2.0 | 0.0 | 0.0 | 0.0 | 3.6 | 3.6 |

Total of CaO, $MgF_2$, $CaF_2$, $SrF_2$, $BaF_2$
5.6

Contents of deoxidizing metal elements

| Si | Al | Ti | Mg | Zr | Ca | Ce | La | Total |
|---|---|---|---|---|---|---|---|---|
| 0.4 | 0.2 | 0.1 | 0.4 | 0.2 | 0.2 | 0.0 | 0.4 | 1.9 |

Alloy ingredients of wire

| C | Si | Mn | P | S | Cu | Ni | Cr | Mo | V | Nb | B | α | Total of P and S |
|---|---|---|---|---|---|---|---|---|---|---|---|---|---|
| 0.06 | 0.40 | 1.64 | 0.013 | 0.016 | 0.00 | 1.20 | 0.00 | 0.36 | 0.00 | 0.00 | 0.01 | 0.25 | 0.029 |

Contents of oxides

| Si oxides | Mn oxides | Al oxides | Ti oxides | B oxides | Zr oxides | Total |
|---|---|---|---|---|---|---|
| 0.4 | 0.0 | 0.0 | 0.2 | 0.1 | 0.0 | 0.7 |

| Contents contained from state in form of MgO, BaO, SrO | | | | Content of iron powder contained in flux |
|---|---|---|---|---|
| MgO | BaO | SrO | Total | Iron powder |
| 0.0 | 0.0 | 0.0 | 0.0 | 1.1 |

| Class | | | Inv. ex. | | | | | Comp. ex. |
|---|---|---|---|---|---|---|---|---|
| Wire Nos. | 97 | 98-101 | 102 | 103 | 104 | 105 | 106 | 107-111 | 112 |
| Flux filling rate | 12 | 12 | 13 | 13 | 14 | 15 | 16 | 16 | 16 |

TABLE 22-continued

| Others | |
|---|---|
| Arc stabilizer | Slit-shaped opening in steel sheath |
| $K_2O$ contained to 0.03% | Yes |

TABLE 23

| Class | Wire no. | Bead formation | Weld defect | Weld metal oxygen amount (ppm) | Charpy test results (J) | Spatter (g/min) | Large-grain spatter rate (%) | Results of evaluation |
|---|---|---|---|---|---|---|---|---|
| | | | | Flat | | | | |
| Inv. ex. | 97 | Good | None | 245 | 220 | 0.8 | 15 | Good |
| Inv. ex. | 98 | Good | None | 244 | 208 | 0.7 | 7 | Good |
| Inv. ex. | 99 | Good | None | 266 | 205 | 0.8 | 7 | Good |
| Inv. ex. | 100 | Good | None | 237 | 204 | 0.8 | 8 | Good |
| Inv. ex. | 101 | Good | None | 220 | 222 | 0.7 | 6 | Good |
| Inv. ex. | 102 | Good | None | 235 | 208 | 0.7 | 7 | Good |
| Inv. ex. | 103 | Good | None | 225 | 200 | 0.7 | 7 | Good |
| Inv. ex. | 104 | Good | None | 265 | 210 | 0.8 | 6 | Good |
| Inv. ex. | 105 | Good | None | 261 | 257 | 0.8 | 5 | Good |
| Inv. ex. | 106 | Good | None | 242 | 232 | 0.8 | 6 | Good |
| Inv. ex. | 107 | Good | None | 252 | 244 | 0.8 | 5 | Good |
| Inv. ex. | 108 | Good | None | 245 | 245 | 0.8 | 6 | Good |
| Inv. ex. | 109 | Good | None | 259 | 236 | 0.8 | 7 | Good |
| Inv. ex. | 110 | Good | None | 256 | 241 | 0.7 | 8 | Good |
| Inv. ex. | 111 | Good | None | 258 | 247 | 0.7 | 7 | Good |
| Comp. ex. | 112 | Good | None | 247 | 240 | 2.1 | 25 | Poor |
| | | | | Overhead | | | | |
| Inv. ex. | 97 | Good | None | 260 | 220 | 0.7 | 17 | Good |
| Inv. ex. | 98 | Good | None | 249 | 208 | 0.8 | 6 | Good |
| Inv. ex. | 99 | Good | None | 263 | 200 | 0.8 | 6 | Good |
| Inv. ex. | 100 | Good | None | 268 | 210 | 0.8 | 7 | Good |
| Inv. ex. | 101 | Good | None | 241 | 257 | 0.7 | 6 | Good |
| Inv. ex. | 102 | Good | None | 251 | 232 | 0.6 | 4 | Good |
| Inv. ex. | 103 | Good | None | 262 | 244 | 0.7 | 6 | Good |
| Inv. ex. | 104 | Good | None | 230 | 205 | 0.8 | 6 | Good |
| Inv. ex. | 105 | Good | None | 242 | 214 | 0.8 | 6 | Good |
| Inv. ex. | 106 | Good | None | 244 | 222 | 0.8 | 6 | Good |
| Inv. ex. | 107 | Good | None | 248 | 208 | 0.8 | 7 | Good |
| Inv. ex. | 108 | Good | None | 257 | 249 | 0.7 | 8 | Good |
| Inv. ex. | 109 | Good | None | 245 | 251 | 0.8 | 9 | Good |
| Inv. ex. | 110 | Good | None | 235 | 253 | 0.7 | 8 | Good |
| Inv. ex. | 111 | Good | None | 244 | 287 | 0.7 | 8 | Good |
| Comp. ex. | 112 | Good | None | 253 | 240 | 2.3 | 22 | Poor |

TABLE 24

| Class | Wire no. | Bead formation | Weld defect | Weld metal oxygen amount (ppm) | Charpy test results (J) | Spatter (g/min) | Large-grain spatter rate (%) | Results of evaluation |
|---|---|---|---|---|---|---|---|---|
| | | | | Vertical | | | | |
| Inv. ex. | 97 | Good | None | 244 | 253 | 0.8 | 16 | Good |
| Inv. ex. | 98 | Good | None | 231 | 254 | 0.8 | 9 | Good |
| Inv. ex. | 99 | Good | None | 263 | 235 | 0.7 | 6 | Good |
| Inv. ex. | 100 | Good | None | 248 | 239 | 0.8 | 8 | Good |
| Inv. ex. | 101 | Good | None | 257 | 287 | 0.8 | 8 | Good |
| Inv. ex. | 102 | Good | None | 265 | 244 | 0.7 | 9 | Good |
| Inv. ex. | 103 | Good | None | 241 | 245 | 0.8 | 7 | Good |
| Inv. ex. | 104 | Good | None | 263 | 263 | 0.7 | 8 | Good |
| Inv. ex. | 105 | Good | None | 240 | 248 | 0.7 | 7 | Good |
| Inv. ex. | 106 | Good | None | 239 | 271 | 0.7 | 8 | Good |
| Inv. ex. | 107 | Good | None | 253 | 223 | 0.6 | 7 | Good |
| Inv. ex. | 108 | Good | None | 255 | 245 | 0.7 | 9 | Good |
| Inv. ex. | 109 | Good | None | 240 | 236 | 0.8 | 7 | Good |
| Inv. ex. | 110 | Good | None | 252 | 240 | 0.7 | 9 | Good |
| Inv. ex. | 111 | Good | None | 263 | 241 | 0.8 | 8 | Good |

TABLE 24-continued

| Class | Wire no. | Bead formation | Weld defect | Weld metal oxygen amount (ppm) | Charpy test results (J) | Spatter (g/min) | Large-grain spatter rate (%) | Results of evaluation |
|---|---|---|---|---|---|---|---|---|
| Comp. ex. | 112 | Good | None | 257 Horizontal | 249 | 2.3 | 29 | Poor |
| Inv. ex. | 97 | Good | None | 249 | 214 | 0.9 | 14 | Good |
| Inv. ex. | 98 | Good | None | 251 | 254 | 0.8 | 8 | Good |
| Inv. ex. | 99 | Good | None | 255 | 235 | 0.8 | 6 | Good |
| Inv. ex. | 100 | Good | None | 248 | 239 | 0.8 | 7 | Good |
| Inv. ex. | 101 | Good | None | 263 | 287 | 0.4 | 5 | Good |
| Inv. ex. | 102 | Good | None | 246 | 244 | 0.4 | 5 | Good |
| Inv. ex. | 103 | Good | None | 242 | 245 | 0.7 | 6 | Good |
| Inv. ex. | 104 | Good | None | 254 | 263 | 0.8 | 7 | Good |
| Inv. ex. | 105 | Good | None | 249 | 248 | 0.8 | 5 | Good |
| Inv. ex. | 106 | Good | None | 237 | 271 | 0.8 | 7 | Good |
| Inv. ex. | 107 | Good | None | 240 | 223 | 0.8 | 6 | Good |
| Inv. ex. | 108 | Good | None | 236 | 256 | 0.8 | 6 | Good |
| Inv. ex. | 109 | Good | None | 241 | 255 | 0.7 | 7 | Good |
| Inv. ex. | 110 | Good | None | 252 | 248 | 0.8 | 8 | Good |
| Inv. ex. | 111 | Good | None | 261 | 243 | 0.7 | 7 | Good |
| Comp. ex. | 112 | Good | None | 247 | 240 | 2.3 | 24 | Poor |

On the other hand, in Wire No. 112 where the total content of $CaCO_3$, $MgCO_3$, $SrCO_3$, and $BaCO_3$ was a mass % with respect to the wire total mass of 4.1%, the content was excessive, so the wire did not satisfy the passing standards for both the total amount of spatter and the large-grain spatter ratio and was not passing.

Next, the content of MgO, BaO, and SrO was examined using the wires of Table 25. The results are shown in Table 26 and Table 27.

In Wire Nos. 114 to 123 where the content of MgO, BaO, and SrO was a mass % with respect to the wire total mass of 0.1% or more and 3.2% or less, the wires were all passing. An effect of smoothening the bead toe angles could also be confirmed. Further, in Wire No. 113 where MgO was not contained in the wire as well, the wire was judged passing.

Further, in Wire No. 117 and Wire Nos. 120 to 123 where the ratio of content of (CaO+MgO)/(Si oxides+Ti oxides) exceeded 1.50, an effect of improvement of slag peeling was confirmed and welding work became easier as a result.

TABLE 25

| | | Mass % with respect to wire total mass | | | | |
|---|---|---|---|---|---|---|
| Class | Wire Nos. | MgO | BaO | SrO | Total content of MgO, BaO, SrO | (CaO + MgO) (Si oxides + Ti oxides) |
| Inv. ex. | 113 | 0.0 | 0.0 | 0.0 | 0.0 | 1.21 |
| Inv. ex. | 114 | 0.1 | 0.0 | 0.0 | 0.1 | 1.29 |
| Inv. ex. | 115 | 0.0 | 0.1 | 0.0 | 0.1 | 1.21 |
| Inv. ex. | 116 | 0.0 | 0.0 | 0.1 | 0.1 | 1.21 |
| Inv. ex. | 117 | 3.2 | 0.0 | 0.0 | 3.2 | 3.50 |
| Inv. ex. | 118 | 0.0 | 3.2 | 0.0 | 3.2 | 1.21 |
| Inv. ex. | 119 | 0.0 | 0.0 | 3.2 | 3.2 | 1.21 |
| Inv. ex. | 120 | 0.5 | 0.0 | 0.0 | 0.5 | 1.57 |
| Inv. ex. | 121 | 1.0 | 0.7 | 0.3 | 2.0 | 1.93 |
| Inv. ex. | 122 | 0.8 | 1.3 | 0.6 | 2.7 | 1.79 |
| Inv. ex. | 123 | 0.9 | 0.5 | 1.8 | 3.2 | 1.86 |
| Comp. ex. | 124 | 3.3 | 0.0 | 0.0 | 3.3 | 3.57 |
| Comp. ex. | 153 | 0.0 | 3.3 | 0.0 | 3.3 | 1.21 |
| Comp. ex. | 154 | 0.0 | 0.0 | 3.3 | 3.3 | 1.21 |
| Comp. ex. | 155 | 0.9 | 0.6 | 1.8 | 3.3 | 1.86 |

The ingredients other than the above were as follows. The units are mass % with respect to the wire total mass.

| Contents of CaO | Contents of fluorides | | | | |
|---|---|---|---|---|---|
| CaO | $MgF_2$ | $CaF_2$ | $SrF_2$ | $BaF_2$ | Total of fluorides |
| 1.7 | 0.0 | 2.9 | 0.0 | 0.0 | 2.9 |

Total of CaO, $MgF_2$, $CaF_2$, $SrF_2$, $BaF_2$
4.6

Contents of deoxidizing metal elements

| Si | Al | Ti | Mg | Zr | Ca | Ce | La | Total |
|---|---|---|---|---|---|---|---|---|
| 0.5 | 0.0 | 0.1 | 0.0 | 0.0 | 0.1 | 0.2 | 0.4 | 1.3 |

TABLE 25-continued

| Alloy ingredients of wire | | | | | | | | | | | | | |
|---|---|---|---|---|---|---|---|---|---|---|---|---|---|
| C | Si | Mn | P | S | Cu | Ni | Cr | Mo | V | Nb | B | α | Total of P and S |
| 0.12 | 0.50 | 2.00 | 0.014 | 0.016 | 0.65 | 1.30 | 0.00 | 0.20 | 0.04 | 0.01 | 0.00 | 0.31 | 0.030 |

| Contents of oxides | | | | | | |
|---|---|---|---|---|---|---|
| Si oxides | Mn oxides | Al oxides | Ti oxides | B oxides | Zr oxides | Total |
| 0.7 | 0.3 | 0.0 | 0.7 | 0.0 | 0.0 | 1.7 |

| Contents of carbonates | | | | | Contents of iron powder contained in flux |
|---|---|---|---|---|---|
| $MgCO_3$ | $CaCO_3$ | $SrCO_3$ | $BaCO_3$ | Total | Iron powder |
| 0.0 | 0.0 | 0.0 | 0.0 | 0.0 | 1.7 |

| Class | Inv. ex. | | | | | | | | Comp. ex. |
|---|---|---|---|---|---|---|---|---|---|
| Wire Nos. | 113 | 114-116 | 117-119 | 120 | 121 | 122 | 123 | 124 | 153-155 |
| Content of MgO, BaO, SrO | 0.0 | 0.1 | 3.2 | 0.7 | 2.0 | 2.7 | 3.2 | 3.3 | 3.3 |
| Flux filling rate | 13 | 13 | 16 | 14 | 15 | 16 | 16 | 16 | 16 |

| Others | |
|---|---|
| Arc stabilizer | Slit-shaped opening in steel sheath |
| $K_2O$ contained to 0.03% | Yes |

TABLE 26

| Class | Wire no. | Bead formation | Weld defect | Bead toe angle (°) | Weld metal oxygen amount (ppm) | Charpy test results (J) | Slag peeling | Results of evaluation |
|---|---|---|---|---|---|---|---|---|
| Flat | | | | | | | | |
| Inv. ex. | 113 | Good | None | 135 | 245 | 214 | B | Good |
| Inv. ex. | 114 | Good | None | 156 | 262 | 254 | B | Good |
| Inv. ex. | 115 | Good | None | 154 | 254 | 235 | B | Good |
| Inv. ex. | 116 | Good | None | 159 | 235 | 239 | B | Good |
| Inv. ex. | 117 | Good | None | 155 | 245 | 287 | A | Good |
| Inv. ex. | 118 | Good | None | 154 | 269 | 244 | B | Good |
| Inv. ex. | 119 | Good | None | 157 | 252 | 245 | B | Good |
| Inv. ex. | 120 | Good | None | 158 | 250 | 263 | A | Good |
| Inv. ex. | 121 | Good | None | 160 | 235 | 248 | A | Good |
| Inv. ex. | 122 | Good | None | 155 | 239 | 271 | A | Good |
| Inv. ex. | 123 | Good | None | 159 | 255 | 223 | A | Good |
| Comp. ex. | 124 | Good | None | 155 | 261 | 247 | A | Good |
| Comp. ex. | 153 | Good | None | 153 | 258 | 244 | B | Good |
| Comp. ex. | 154 | Good | None | 158 | 259 | 240 | B | Good |
| Comp. ex. | 155 | Good | None | 157 | 266 | 251 | A | Good |
| Overhead | | | | | | | | |
| Inv. ex. | 113 | Good | None | 141 | 265 | 214 | B | Good |
| Inv. ex. | 114 | Good | None | 154 | 249 | 254 | B | Good |
| Inv. ex. | 115 | Good | None | 159 | 263 | 235 | B | Good |
| Inv. ex. | 116 | Good | None | 153 | 268 | 239 | B | Good |
| Inv. ex. | 117 | Good | None | 159 | 241 | 287 | A | Good |
| Inv. ex. | 118 | Good | None | 160 | 241 | 244 | B | Good |
| Inv. ex. | 119 | Good | None | 161 | 262 | 245 | B | Good |
| Inv. ex. | 120 | Good | None | 162 | 240 | 263 | A | Good |
| Inv. ex. | 121 | Good | None | 159 | 242 | 248 | A | Good |
| Inv. ex. | 122 | Good | None | 157 | 254 | 271 | A | Good |
| Inv. ex. | 123 | Good | None | 153 | 248 | 223 | A | Good |
| Comp. ex. | 124 | Poor | | Welding impossible | | | | Poor |
| Comp. ex. | 153 | Poor | | Welding impossible | | | | Poor |

TABLE 26-continued

| Class | Wire no. | Bead formation | Weld defect | Bead toe angle (°) | Weld metal oxygen amount (ppm) | Charpy test results (J) | Slag peeling | Results of evaluation |
|---|---|---|---|---|---|---|---|---|
| Comp. ex. | 154 | Poor | | Welding impossible | | | | Poor |
| Comp. ex. | 155 | Poor | | Welding impossible | | | | Poor |

TABLE 27

| Class | Wire no. | Bead formation | Weld defect | Bead toe angle (°) | Weld metal oxygen amount (ppm) | Charpy test results (J) | Slag peeling | Results of evaluation |
|---|---|---|---|---|---|---|---|---|
| Vertical | | | | | | | | |
| Inv. ex. | 113 | Good | None | 133 | 245 | 214 | B | Good |
| Inv. ex. | 114 | Good | None | 160 | 231 | 254 | B | Good |
| Inv. ex. | 115 | Good | None | 161 | 263 | 235 | B | Good |
| Inv. ex. | 116 | Good | None | 160 | 248 | 239 | B | Good |
| Inv. ex. | 117 | Good | None | 158 | 257 | 287 | A | Good |
| Inv. ex. | 118 | Good | None | 159 | 265 | 244 | B | Good |
| Inv. ex. | 119 | Good | None | 165 | 268 | 245 | B | Good |
| Inv. ex. | 120 | Good | None | 160 | 261 | 263 | A | Good |
| Inv. ex. | 121 | Good | None | 155 | 240 | 248 | A | Good |
| Inv. ex. | 122 | Good | None | 157 | 239 | 271 | A | Good |
| Inv. ex. | 123 | Good | None | 153 | 244 | 223 | A | Good |
| Comp. ex. | 124 | Poor | | Welding impossible | | | | Poor |
| Comp. ex. | 153 | Poor | | Welding impossible | | | | Poor |
| Comp. ex. | 154 | Poor | | Welding impossible | | | | Poor |
| Comp. ex. | 155 | Poor | | Welding impossible | | | | Poor |
| Horizontal | | | | | | | | |
| Inv. ex. | 113 | Good | None | 136 | 249 | 214 | B | Good |
| Inv. ex. | 114 | Good | None | 156 | 251 | 254 | B | Good |
| Inv. ex. | 115 | Good | None | 154 | 255 | 235 | B | Good |
| Inv. ex. | 116 | Good | None | 158 | 248 | 239 | B | Good |
| Inv. ex. | 117 | Good | None | 157 | 263 | 287 | A | Good |
| Inv. ex. | 118 | Good | None | 152 | 246 | 244 | B | Good |
| Inv. ex. | 119 | Good | None | 151 | 252 | 245 | B | Good |
| Inv. ex. | 120 | Good | None | 160 | 254 | 263 | A | Good |
| Inv. ex. | 121 | Good | None | 162 | 249 | 248 | A | Good |
| Inv. ex. | 122 | Good | None | 154 | 237 | 271 | A | Good |
| Inv. ex. | 123 | Good | None | 157 | 240 | 223 | A | Good |
| Comp. ex. | 124 | Poor | | Welding impossible | | | | Poor |
| Comp. ex. | 153 | Poor | | Welding impossible | | | | Poor |
| Comp. ex. | 154 | Poor | | Welding impossible | | | | Poor |
| Comp. ex. | 155 | Poor | | Welding impossible | | | | Poor |

On the other hand, in Wire Nos. 124 and 153 to 155 where the content of MgO, BaO, and SrO was a mass % with respect to the wire total mass of 3.3%, the content was excessive, so welding was not possible. Since welding was impossible in the vertical, overhead, and horizontal positions, the wire was not passing.

Finally, the slit of the steel sheath was examined using the wires of Table 28. That is, prototype wires of the wire numbers at the left side of Table 28 and prototype wires of the wire numbers of the right side of Table 28 which differ in only the point of the existence of a slit-shaped opening which causes absorption of moisture at the steel sheath were produced and evaluated for diffusive hydrogen. The results are shown in Table 29.

In both wires with a slit at the steel sheath and wires with no slit at the steel sheath, the wires were all passing, so in wires with no slit at the steel sheath, a clear effect of reduction of diffusive hydrogen could be observed.

TABLE 28

| Class | Wire no. | Slit of wire causing moisture adsorption | Class | Wire no. | Slit of wire causing moisture adsorption |
|---|---|---|---|---|---|
| Inv. ex. | 1 | Yes | Inv. ex. | 125 | None |
| Inv. ex. | 7 | Yes | Inv. ex. | 126 | None |
| Inv. ex. | 11 | Yes | Inv. ex. | 127 | None |
| Inv. ex. | 14 | Yes | Inv. ex. | 128 | None |
| Inv. ex. | 20 | Yes | Inv. ex. | 129 | None |
| Inv. ex. | 29 | Yes | Inv. ex. | 130 | None |
| Inv. ex. | 33 | Yes | Inv. ex. | 131 | None |
| Inv. ex. | 43 | Yes | Inv. ex. | 132 | None |
| Inv. ex. | 53 | Yes | Inv. ex. | 133 | None |
| Inv. ex. | 57 | Yes | Inv. ex. | 134 | None |
| Inv. ex. | 61 | Yes | Inv. ex. | 135 | None |
| Inv. ex. | 65 | Yes | Inv. ex. | 136 | None |
| Inv. ex. | 69 | Yes | Inv. ex. | 137 | None |
| Inv. ex. | 76 | Yes | Inv. ex. | 138 | None |
| Inv. ex. | 79 | Yes | Inv. ex. | 139 | None |
| Inv. ex. | 87 | Yes | Inv. ex. | 140 | None |
| Inv. ex. | 91 | Yes | Inv. ex. | 141 | None |
| Inv. ex. | 95 | Yes | Inv. ex. | 142 | None |
| Inv. ex. | 97 | Yes | Inv. ex. | 143 | None |
| Inv. ex. | 104 | Yes | Inv. ex. | 144 | None |
| Inv. ex. | 111 | Yes | Inv. ex. | 145 | None |
| Inv. ex. | 113 | Yes | Inv. ex. | 146 | None |
| Inv. ex. | 118 | Yes | Inv. ex. | 147 | None |
| Inv. ex. | 123 | Yes | Inv. ex. | 148 | None |

Wires made with same wire ingredients but without slit in steel sheath

In the above table, Wire Nos. 1 and 125 are the same in composition and differ in only the point of the existence of a slit in the steel sheath.
In the same way as below, the right table and the left table have the same compositions in corresponding numbers. Tests were run by changing only the existence of a slit in the steel sheath.

TABLE 29

| | Flat | | |
|---|---|---|---|
| Class | Wire no. | Diffusive hydrogen (ppm) | Results of evaluation |
| Inv. ex. | 1 | 5 | Good |
| Inv. ex. | 7 | 4 | Good |
| Inv. ex. | 11 | 5 | Good |
| Inv. ex. | 14 | 5 | Good |
| Inv. ex. | 19 | 4 | Good |
| Inv. ex. | 26 | 5 | Good |
| Inv. ex. | 30 | 5 | Good |
| Inv. ex. | 39 | 4 | Good |
| Inv. ex. | 50 | 5 | Good |
| Inv. ex. | 54 | 4 | Good |
| Inv. ex. | 58 | 5 | Good |
| Inv. ex. | 61 | 5 | Good |
| Inv. ex. | 66 | 4 | Good |
| Inv. ex. | 73 | 5 | Good |
| Inv. ex. | 81 | 4 | Good |
| Inv. ex. | 86 | 5 | Good |
| Inv. ex. | 90 | 5 | Good |
| Inv. ex. | 94 | 4 | Good |
| Inv. ex. | 96 | 4 | Good |
| Inv. ex. | 103 | 5 | Good |
| Inv. ex. | 110 | 4 | Good |
| Inv. ex. | 112 | 4 | Good |
| Inv. ex. | 117 | 5 | Good |
| Inv. ex. | 122 | 4 | Good |
| Inv. ex. | 125 | 2 | Good |
| Inv. ex. | 126 | 2 | Good |
| Inv. ex. | 127 | 1 | Good |
| Inv. ex. | 128 | 2 | Good |
| Inv. ex. | 129 | 2 | Good |
| Inv. ex. | 130 | 2 | Good |
| Inv. ex. | 131 | 1 | Good |
| Inv. ex. | 132 | 2 | Good |
| Inv. ex. | 133 | 1 | Good |
| Inv. ex. | 134 | 2 | Good |
| Inv. ex. | 135 | 2 | Good |
| Inv. ex. | 136 | 2 | Good |
| Inv. ex. | 137 | 2 | Good |
| Inv. ex. | 138 | 1 | Good |
| Inv. ex. | 139 | 2 | Good |
| Inv. ex. | 140 | 2 | Good |
| Inv. ex. | 141 | 2 | Good |
| Inv. ex. | 142 | 2 | Good |
| Inv. ex. | 143 | 1 | Good |
| Inv. ex. | 144 | 2 | Good |
| Inv. ex. | 145 | 2 | Good |
| Inv. ex. | 146 | 2 | Good |
| Inv. ex. | 147 | 1 | Good |
| Inv. ex. | 148 | 2 | Good |

The test results of the examples which were explained above are shown together in Table 30 as results of overall evaluation.

TABLE 30

| Claim | Verified items | Class | Wire nos. | Flat | Vertical | Horizontal | Overhead | Results of overall evaluation |
|---|---|---|---|---|---|---|---|---|
| 1 | Content of CaO | Inv. ex. | 1-11 | Good | Good | Good | Good | Good |
| | | Comp. ex. | 12 | Good | Poor | Poor | Poor | Poor |
| | | | 13 | Poor | Poor | Poor | Poor | Poor |
| | Total content of CaO and $MgF_2$, $CaF_2$, $SrF_2$, $BaF_2$ | Inv. ex. | 14-29 | Good | Good | Good | Good | Good |
| | | Comp. ex. | 30 | Poor | Poor | Poor | Poor | Poor |
| | | Comp. ex. | 31 | Good | Poor | Poor | Poor | Poor |
| | | Comp. ex. | 32 | Poor | Poor | Poor | Poor | Poor |
| | Deoxidizing | Inv. ex. | 33-53 | Good | Good | Good | Good | Good |

TABLE 30-continued

| Claim | Verified items | Class | Wire nos. | Flat | Vertical | Horizontal | Overhead | Results of overall evaluation |
|---|---|---|---|---|---|---|---|---|
| | metal elements | Comp. ex. | 54-56 | Poor | Poor | Poor | Poor | Poor |
| | Value of α and contents of P and S | Inv. ex. | 57-65 | Good | Good | Good | Good | Good |
| | | Comp. ex. | 66-68 | Poor | Poor | Poor | Poor | Poor |
| | Total content of Si oxides, Mn oxides, Al oxides, Zr oxides Ti oxides, B oxides | Inv. ex. | 69-84 149-151 | Good | Good | Good | Good | Good |
| | | Comp. ex. | 85-86 152 | Poor | Poor | Poor | Poor | Poor |
| | Content of iron powder in flux | Inv. ex. | 87-95 | Good | Good | Good | Good | Good |
| | | Comp. ex. | 96 | Poor | Poor | Poor | Poor | Poor |
| 2 | Content of carbonates | Inv. ex. | 97-111 | Good | Good | Good | Good | Good |
| | | Comp. ex. | 112 | Poor | Poor | Poor | Poor | Poor |
| 3 | Content of MgO, BaO, SrO | Inv. ex. | 113-123 | Good | Good | Good | Good | Good |
| | | Comp. ex. | 124, 153-155 | Good | Poor | Poor | Poor | Poor |
| 4 | Steel sheath slit | Inv. ex. | 125-148 | Good | Good | Good | Good | Good |

The invention claimed is:

1. A flux-cored wire for gas shielded arc welding use comprising a steel sheath which is filled with a flux, said flux-cored wire comprising:
   (a) CaO, in a mass % with respect to the wire total mass, of 2.0% or more and 4.9% or less;
   (b) one or more of $MgF_2$, $CaF_2$, $SrF_2$, and $BaF_2$, having a total content in a mass % with respect to the wire total mass, of 1.0% or more, and wherein the total amount of CaO and one or more of $MgF_2$, $CaF_2$, $SrF_2$, and $BaF_2$ is, in a mass % with respect to the wire total mass, 3.0% or more and 12.0% or less;
   (c) one or more of a metal state Si, Al, Ti, Mg, Zr, Ca, Ce, and La, having a total content in a mass % with respect to the wire total mass, of 0.2% or more and 2.0% or less, and wherein the content of metal state Al is limited to, in a mass % with respect to the wire total mass, less than 0.3%;
   (d) a total content of Si oxides, Mn oxides, Al oxides, Ti oxides, B oxides, and Zr oxides, in a mass % with respect to the wire total mass, of 0.2% or more and 3.0% or less;
   (e) at least one of C, Si, Mn, Cu, Ni, Cr, Mo, V, Nb or B such that a value of α which is defined by the following formula, $$\alpha = N(C) + N(Si)/30 + N(Mn)/20 + N(Cu)/20 + N(Ni)/60 + N(Cr)/20 + N(Mo)/15 + N(V)/10 + N(Nb)/10 + 5N(B),$$

is 0.15 or more and 0.40 or less, wherein N(X): mass % of the element X with respect to the wire total mass, and wherein a total amount of P and S is limited to, in a mass % with respect to the wire total mass, 0.040% or less; and
   (f) a balance of Fe, an arc stabilizer, and unavoidable impurities, wherein a content of iron powder in the flux is, in a mass % with respect to the wire total mass, 5.0% or less, and wherein a total mass of the flux which is filled in the steel sheath is, in a mass % with respect to the wire total mass, 6.0% or more and 18.0% or less.

2. The flux-cored wire for gas shielded arc welding use as set forth in claim 1, further comprising one or more of $CaCO_3$, $MgCO_3$, $SrCO_3$, and $BaCO_3$, with respect to the wire total mass, of 0.1 mass % or more and 4.0 mass % or less.

3. The flux-cored wire for gas shielded arc welding use as set forth in claim 1 or 2, further comprising one or more of MgO, SrO, and BaO, with respect to the wire total mass, of 0.1 mass % or more and 3.2 mass % or less.

4. The flux-cored wire for gas shielded arc welding use as set forth in claim 1 or 2, wherein there is no slit-shaped opening causing absorption of moisture in said steel sheath.

5. The flux-cored wire for gas shielded arc welding use as set forth in claim 3, wherein there is no slit-shaped opening causing absorption of moisture in said steel sheath.

* * * * *